United States Patent [19]
Obata et al.

[11] Patent Number: 5,597,997
[45] Date of Patent: Jan. 28, 1997

[54] OPTICAL INFORMATION READER

[75] Inventors: Kenzo Obata, Okazaki; Yosimi Kitazumi, Chiryu; Takeshi Watanabe; Kouji Teramae, both of Kariya; Tadao Nojiri, Oubu, all of Japan

[73] Assignee: Nippondenso Co., Ltd., Kariya, Japan

[21] Appl. No.: 540,239

[22] Filed: Oct. 5, 1995

Related U.S. Application Data

[63] Continuation of Ser. No. 168,092, Dec. 17, 1993, abandoned.

[30] Foreign Application Priority Data

Dec. 18, 1992 [JP] Japan .................................. 4-339074
Mar. 1, 1993 [JP] Japan .................................. 5-040065

[51] Int. Cl.$^6$ .................................................. G06K 7/10
[52] U.S. Cl. .................................... 235/455; 235/462
[58] Field of Search .................................. 235/454, 455, 235/462, 472, 470

[56] References Cited

U.S. PATENT DOCUMENTS

| | | | |
|---|---|---|---|
| 4,202,491 | 5/1980 | Suzuki | 235/491 |
| 4,795,224 | 1/1989 | Goto | 350/236 |
| 4,808,804 | 2/1989 | Krichever et al. | 235/462 |
| 4,843,222 | 6/1989 | Hochgraf | 235/46 R X |
| 4,877,949 | 10/1989 | Danielson et al. | 235/462 |
| 4,900,907 | 2/1990 | Matusina et al. | 235/472 |
| 5,298,734 | 3/1994 | Kokubo | 250/208.1 |
| 5,303,052 | 4/1994 | Narabu et al. | 348/299 |
| 5,367,379 | 11/1994 | Makino | 356/446 |
| 5,396,288 | 3/1995 | Tsugita et al. | 348/229 |

FOREIGN PATENT DOCUMENTS

| | | | |
|---|---|---|---|
| 0101939 | 3/1984 | European Pat. Off. | 235/462 |
| 0221545 | 5/1987 | European Pat. Off. | 235/462 |
| 0238067 | 9/1987 | European Pat. Off. | 235/462 |
| 0488202 | 6/1992 | European Pat. Off. | 235/462 |
| 63-184179 | 7/1988 | Japan | 235/472 |
| 63-225884 | 9/1988 | Japan | 235/454 |
| 2-19877 | 5/1990 | Japan | 235/454 |
| 0183386 | 7/1990 | Japan | 235/455 |

*Primary Examiner*—Donald T. Hajec
*Assistant Examiner*—Thien Minh Le
*Attorney, Agent, or Firm*—Cushman, Darby & Cushman IP Group of Pillsbury Madison & Sutro LLP

[57] ABSTRACT

To accurately read optical information more than an opening diameter of a read opening without the read opening contacted with a reading object, in a reader for reading a bar code by irradiating light from a light source to a bar-code label, converging the reflected light through a mirror and a stop by a lens and focusing the converged light on a line image sensor with a shutter, a wavelength detector for detecting a wavelength of the reflected light and a light guide for irradiating light spots indicative of a readable range to the label are provided. Whether a reading state is in a contact reading state in which a read opening contacts the label or in a noncontact reading state in which the read opening separates from the label is determined based on a wavelength of the reflected light detected by the wavelength detector. A light emission quantity and a shutter speed are controlled so as to keep an incident light quantity to the image sensor at an optimum value on a basis of the decided result and reflected light intensity obtained by integrating a line sensor output.

28 Claims, 33 Drawing Sheets

FORWARD CURRENT-LIGHT EMISSION
INTENSITY CHARACTERISTICS

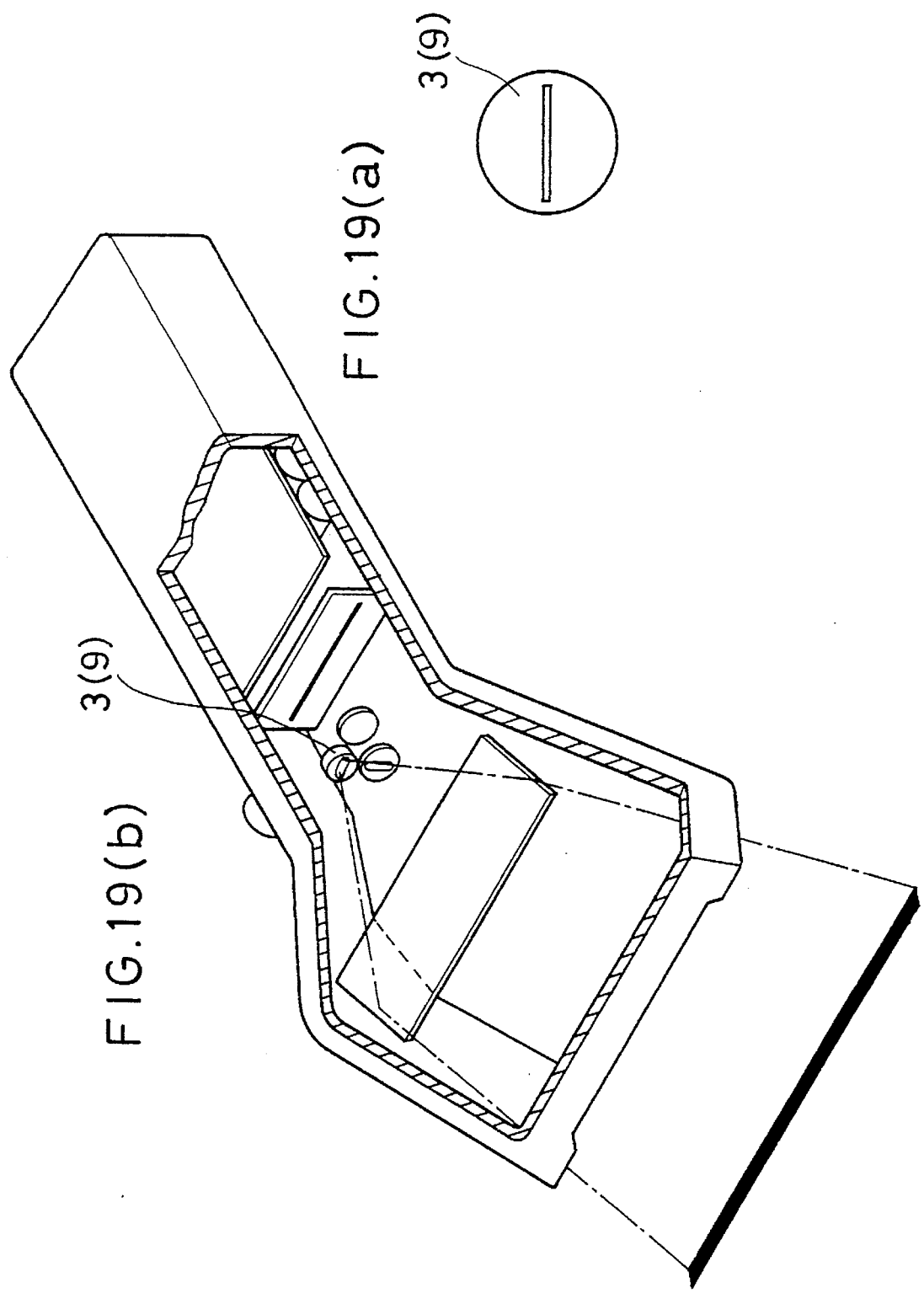

62

OPTICAL INFORMATION READER

This is a continuation of application Ser. No. 08/168,092, filed on Dec. 17, 1993, now abandoned.

BACKGROUND OF THE INVENTION

1. Field of the Invention

The present invention relates to an optical information reader for reading optical information from/a read object on which such optical information as a bar code or the like is printed or recorded.

2. Description of Related Art

Conventionally, as an optical information reader of this kind, as shown in FIG. 25, a bar-code reader 90 is well known in which a light source 83, a lens 86, an image sensor (hereinafter called as a line sensor) 87, a trigger switch 88 and an electronic circuit board 89 are assembled integrally into a hand-held housing 80. The light source 83 is constructed to array in line plural light emission diodes for irradiating light to a bar-code label 82 on which a bar code 81 is printed. The lens 86 converges reflected light from the bar-code label 82 through a mirror 84 and a stop or an iris diaphragm 85 to focus an image of the bar-code label 82 on a rear portion. The line sensor 87 is arranged at a focusing position of the lens 86 and constructed by arraying charge coupled-elements in line for converting the image of the bar-code label 82 into an electric signal. The trigger switch 88 inputs reading instruction of the bar code 81 with manual operation. The electronic circuit board 89 is connected to the light source 83, line sensor 87 and trigger switch 88.

As shown in FIG. 26, on the electronic circuit board 89, an amplifier 91, a binarizing circuit 92, a count part 93, a decode part 95, a control part 96, a power source 97 and the like are mounted. The amplifier 91 amplifies a feeble analog image signal outputted by the line sensor 87. The binarizing circuit 92 binarizes the analog image signal amplified by the amplifier 91 to convert the binarized signal into a digital signal. The count part 93 counts a width of the digital signal outputted by the binarizing circuit 92 to measure widths of bars and spaces of the bar code 81. The decode part 95 decodes the bar code 81 on a basis of an output signal from the count part 93 and outputs the decoded result to an external circuit through an external terminal 94. When reading instruction of the bar code 81 is inputted by actuation of the trigger switch 88, the control part 96 causes the light source 83 to be driven so as to irradiate the bar code 82 and also causes the count part 93 and decode part 95 to operate so as to output the decoded result of the bar code 81 at the external terminal. In addition, generally, the count part 93, decode part 95 and control part 96 are realized by a microcomputer (ECU) which comprises CPU, ROM, RAM and the like.

However, such a conventional bar code reader is a so-called touch type bar code reader which reads the bar code 81 in contact with a read opening 80a of the housing 80 providing a passage of the irradiated light and reflected light with the bar-code label 82. Thus, it becomes difficult to correctly read the bar code 81 when the read opening 80a is separated or kept apart from the bar-code label 82.

Namely, when the read opening 80a contacts the bar-code label 82 in such a conventional bar-code reader, an optical path length of light reaching the line sensor 87 from the light source 83 through the bar-code label 82 is maintained constant. Moreover, there is very little external light entering into the optical path in the housing 80. Thus, intensity of reflected light entering into the line sensor 87 is varied only substantially according to the bar code 81.

When the read opening 80a is separated from the bar-code label 82, however, the optical path of light reaching the line sensor 87 from the light source 83 becomes long. Moreover, the external light enters into the optical path. Therefore, intensity of reflected light entering into the line sensor 87 changes largely according to attenuation of the irradiated light and increase of reflected light caused by external light on the optical path. Thus, in the conventional bar-code reader, a quantity of reflected light to be converted into an electric signal by the line sensor 87 is too much or too little. As the result, it becomes difficult to correctly read the bar code 81.

In the conventional bar-code reader, as described above, it is necessary to contact the read opening 80a with the bar-code label 82. There is, therefore, also a problem that a bar code having a total width which is more than an opening diameter W of the read opening 80a may not be read.

SUMMARY OF THE INVENTION

It is therefore, an object of the present invention to provide an optical information reader capable of accurately reading optical information more than an opening diameter of a read opening with the read opening separated or kept apart from a read object on which such optical information as a bar code or the like is printed or recorded.

For attaining the above-mentioned object, the optical information reader according to the invention is characterized by, as shown in FIG. 1, in addition to light source means for irradiating light to a reading object on which optical information is written, an optical system for converging reflected light within a predetermined angular range which is reflected by the reading object to enter through a read opening of the reader and for focusing an information image indicative of the optical information at a predetermined reading position, and image pick-up or sensor means arranged at the reading position for converting the information image into an electric signal: light intensity detection means for detecting intensity of the reflected light; and control means for controlling information reading operation, for instance, exposure time of the image pick-up means and/or intensity of light from the light source means, on a basis of the detected result of the light intensity detection means.

The optical information reader is, as shown in FIG. 1, characterized in that light guide means for irradiating guide light indicative of readable range of the reader to the reading object is provided. The light guide means and the light source means uses a common light source.

The optical information reader, as shown by dotted lines in FIG. 1, is characterized in that the control means controls the light emission quantity of at least one of the light source means and the light guide means together with the exposure time of the image pick-up means.

The optical information reader is characterized in that, as shown by two dot and dash lines in FIG. 1, reading state decision means is provided for determining whether a reading state of the optical information of the reader is in a contact reading state in which the read opening contacts the reading object or in a noncontact reading state in which the reading opening separates from the reading object, and in that the control means controls the exposure time or both of the exposure time and light emission quantity on a basis of the detected result of the light intensity detection means and the decision result of the reading state decision means. The reading state decision means is constructed by wavelength detection means for detecting a wavelength of reflected light reflected by the reading object when the light source means has irradiated light. Wavelength decision means decides, based on a wavelength of the detected reflected light, as to whether the reflected light is caused solely by light which the light source means has irradiated or it includes external light.

The optical information reader is characterized in that the reading state decision means reads, from the light intensity detection means, reflected light intensity when the light source means has irradiated light and reflected light intensity when the light source means does not irradiate light, and decides a reading state of the optical information on a basis of a ratio of both of the reflected light intensity. Alternatively, the optical information reader is characterized in that the reading state decision means is provided with reflected light width detection means for detecting a width of reflected light caused by irradiation of the guide light on a basis of an electric signal outputted by the image pick-up means when the light guide means has irradiated the guide light, the reading state decision means deciding a reading state of the optical information on a basis of the detected width of the reflected light.

The optical information reader is characterized in that the light source means is constructed by a large number of light emission diodes which are arranged at more than two rows in a width direction of the read opening such that irradiating directions of light of the respective rows of the light emission diodes are set in directions different from each other.

Further, the optical information reader is characterized in that an outer wall of the read opening is slanted along an angular range in which the optical system for imaging converges the reflected light.

In the optical information reader constructed as described above, the light source means irradiates light to the reading object, the optical system for imaging converges reflected light reflected by the reading object to focus an information image indicative of the optical information on the image pick-up means, and the image pick-up means converts the information image into an electric signal. The optical system for imaging converges the reflected light within the predetermined angular range entering through the read opening of the reader to focus the information image on the image pick-up means. Thus, to separate or keep apart the read opening from the read object increases a readable range of the optical information.

Meanwhile, separation of the read opening from the reading object changes largely intensity of reflected light entering into the image pick-up means due to the separated distance, external light and the like. However, the light intensity detection means detects intensity of the reflected light, the control means controls exposure time of the image pick-up means on a basis of the detected result. Thus, it is possible to always stabilize a quantity of the reflected light for which the image pick-up means converts the image information into an electric signal. Thus, it becomes possible to read the optical information without contact of the read opening with the reading object. Moreover, the more the read opening separates from the reading object, the more the readable range of the optical information increases. Thus, it is possible to read wide optical information without any limit caused by an opening diameter of the read opening.

Further, the light guide means irradiates guide light to the reading object. Thus, it is possible to guide the readable range of the reader to a user or operator when the optical information is read in a state separating the read opening from the reading object. This results in improvement in manipulation.

The light guide means and the light source means uses a common light source. Thus, it is possible to guide the readable range with the guide light by a single light source.

The control means controls the light emission quantity of the light source or the light emission quantity of the light source means and light guide means together with the exposure time of the image pick-up means. Thus, it is possible to directly control change of the reflected light intensity caused by separation of the read opening from the reading object in accordance with the light emission quantity of the light source means or the light emission quantity of the light source means and light guide means. As a result, it becomes possible to stabilize the reflected light quantity even if there has occurred large change in the reflected light intensity in which reflected light quantity when the image pick-up means converts the image information into the electric signal may not be stabilized by only the exposure time of the image pick-up means. This enables enlargement of environment condition when the optical information is read.

The reading state decision means decides whether a reading state of the optical information of the reader is in a contact reading state in which the read opening contacts the reading object or in a noncontact reading state in which the reading opening separates from the reading object, and the control means controls exposure time of the image pick-up means and a light emission quantity of the light emission means or both of the light emission means and light guide means on a basis of the detected result of the light intensity detection means and the decided result of the reading state decision means. Thus, it is possible to switch over control operation of the control means in both of the contact reading state in which the reflected light intensity is substantially stable and the noncontact reading state in which the reflected light fluctuates largely. As a result, it is possible to efficiently control the reflected light quantity when the image pick-up means converts the image information into the electric signal. That is, in the contact reading state, the exposure time and light emission quantity have only to be controlled into a predetermined value in accordance with properties of the reader because the reflected light intensity is stable. Thus, it is unnecessary to perform such control operation as detection of the reflected light intensity, calculation of the exposure time and calculation of the light emission quantity. The reading state decision means decides a reading state of the optical information. Thus, in case of the contact reading state it is possible to set the exposure time and light emission quantity without such control operation as detection of the reflected light intensity, calculation of the exposure time and calculation of the light emission quantity. As the result, with the optical information reader the control operation when the reading state of the optical information is the contact reading state is simplified to enable improvement in a reading speed of the optical information.

The wavelength detection means detects a wavelength of the reflected light reflected by the reading object when the light source means has irradiated light, and the wavelength decision means decides, based on the detected wavelength, as to whether the reflected light is reflected light caused by light which the light source means has irradiated or reflected light including external light. Namely, if the reading state of the optical information is in the contact reading state, a wavelength of the reflected light accords with a wavelength of light which the light source means has irradiated. If the reading state of the optical information is in the noncontact reading state conversely, the reflected light includes a wavelength different from the wavelength of light which the light source means has irradiated. Thus, the reading state of the optical information is decided by whether or not the wavelength of the reflected light accords with the wavelength of light which the light source means has irradiated.

Reflected light intensity when the light source means has irradiated light and reflected light intensity when the light source means does not irradiate light are read from the light intensity detection means, and a reading state of the optical information is decided based on a ratio of both the reflected light intensity. Namely, if the reading state of the optical information is in the contact reading state, there are hardly influences caused by external light. Thus, the reflected light intensity when the light source means does not irradiate light becomes about zero and the ratio of both the reflected light intensity becomes infinity. If the reading state of the optical information is in the noncontact reading state, however, there are surely influences caused by external light and the ratio of both the reflected light intensity becomes surely small compared with the ratio in the contact reading state. Thus, the reading state of the optical information is decided by whether the ratio of both the reflected light intensity is more than a constant value or not. Accordingly, it becomes unnecessary to provide wavelength detection means and becomes possible to simplify construction of the reader.

Next, a width of the reflected light caused by irradiation of guide light is detected by the reflected light width detection means on a basis of an electric signal outputted from the image pick-up means when the light guide means has irradiated guide light and a reading state of the optical information is decided based on the detected width of the reflected light. Namely, the more the read opening separates from the reading object, the more the readable range of the optical information may be enlarged. In this case, the guide light which the light guide has irradiated is also enlarged on the reading object. Accordingly, a high portion of the reflected light intensity corresponding to the guide light in the image information focused on the image pick-up means is different in both the contact reading state and the non-contact reading state, being wider in the noncontact reading state. Thus, a width of the high portion of the reflected light corresponding to the guide light is detected based on an electric signal outputted by the image pick-up means and a reading state of the optical information is decided by whether the detected width accords with a width (a constant width) in the contact reading state or not. Accordingly, it becomes unnecessary to provide wavelength detection means separately and becomes possible to enable simplification in construction of the reader.

Furthermore, the reading state of the optical information may be determined by detecting reflected light intensity when the light intensity detection means has for instance irradiated light with constant intensity and deciding whether the detected reflected light intensity is within a predetermined range or not. Namely, in case of the contact reading state the reflected light intensity is maintained in a nearly stable predetermined range although it changes in accordance with the optical information. In case of the noncontact reading state, conversely, the reflected light intensity deviates largely from this predetermined range. Thus, the reading state of the optical information may be decided by merely determining whether the reflected light intensity is in the predetermined range or not.

The light source means is constructed by a large number of light emission diodes which are arranged at more than two rows in a width direction of the read opening such that irradiating directions of light in the respective rows of light emission diodes are set in directions different from each other. Thus, with the reader it is possible to change an incident angle of the irradiated light into the reading object at every row. As a result, the optical information may be surely read from a reading object causing mirror reflection. Namely, even if irradiated light from the one row of the light emission diodes is reflected specularly, the optical information may be read by irradiated light from the other row of the light emission diodes. Thus, it is possible to prevent lowering of reading performance caused by specular reflection.

Finally, the outer wall of the read opening is slanted along an angular range in which the optical system for imaging converges reflected light. Thus, the user may roughly recognize the reading range without use of the light guide means by looking at the reading object along the outer wall of the read opening at the noncontact reading state.

BRIEF DESCRIPTION OF THE DRAWINGS

In the accompanying drawings:

FIG. 19(a) and 19(b) are outlined construction views indicative of construction in case the light source is given function as a light guide;

DETAILED DESCRIPTION OF THE PREFERRED EMBODIMENTS

Hereinafter, an embodiment of the present invention will be explained in more detail with reference to the accompanying drawings.

Figure 1:
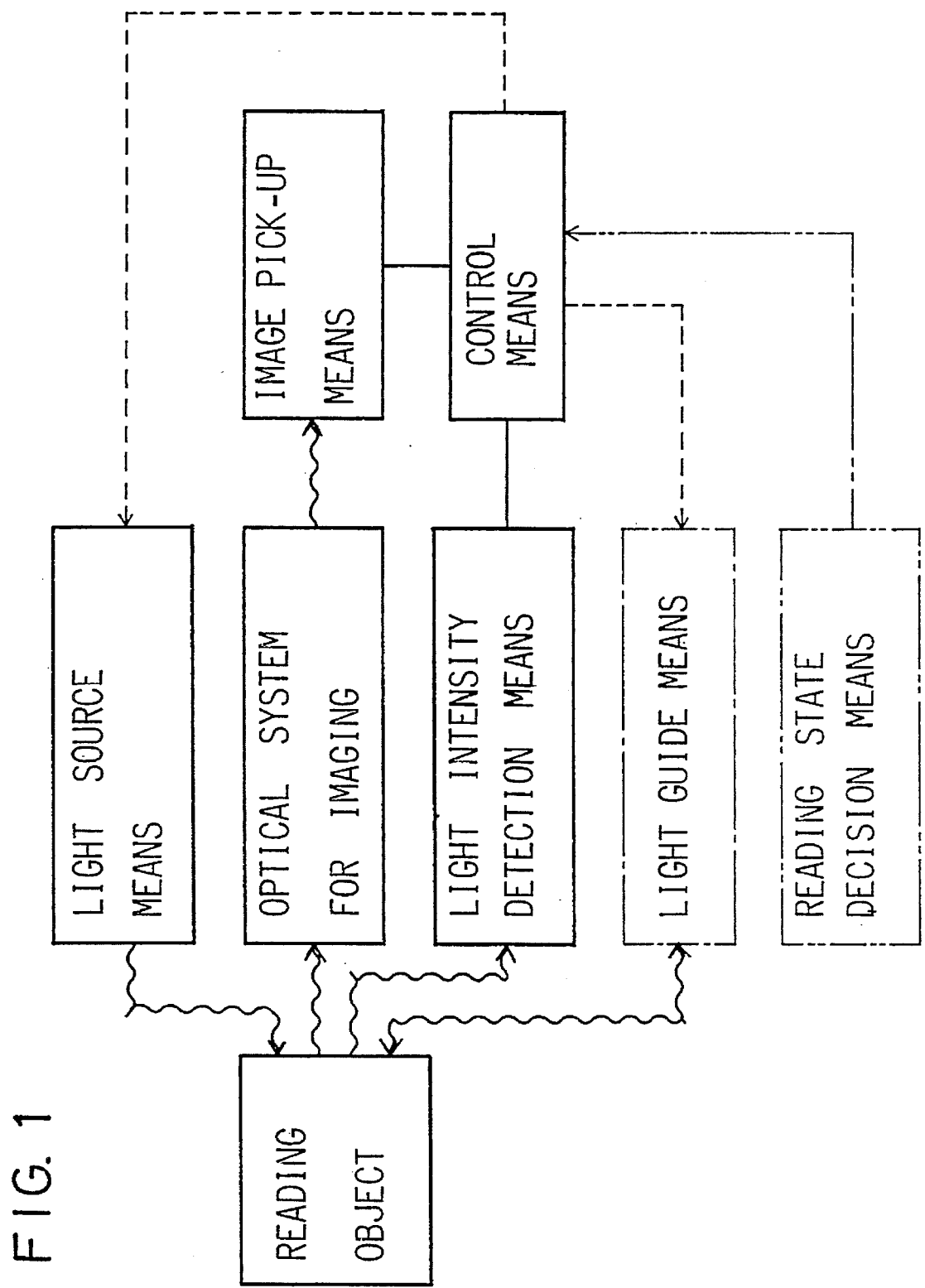
FIG. 1 is a block diagram illustrating construction of the present invention.
Figure 2:
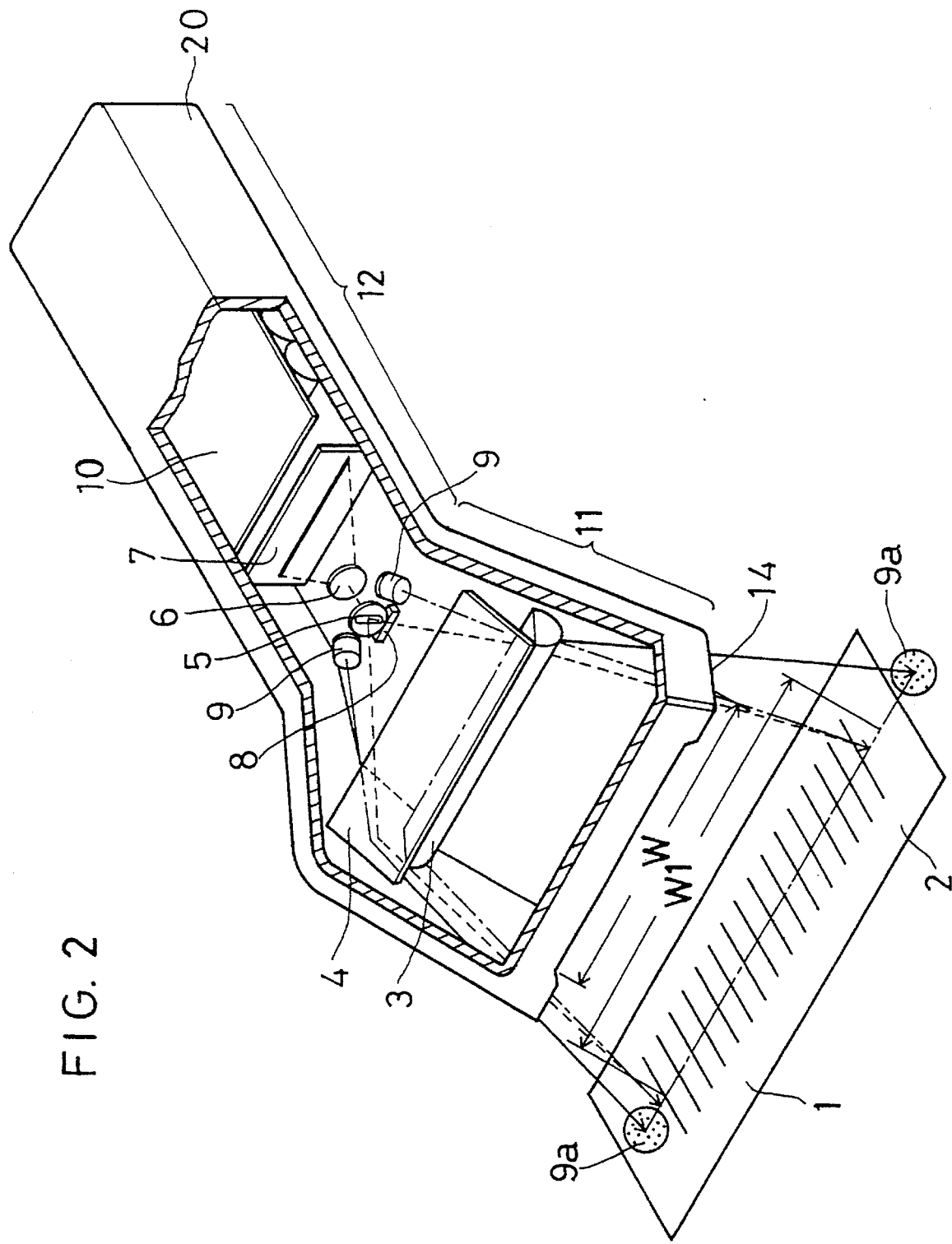
FIG. 2 is a partially broken perspective view indicating the whole construction of a bar-code reader of an embodiment.
Figure 25:
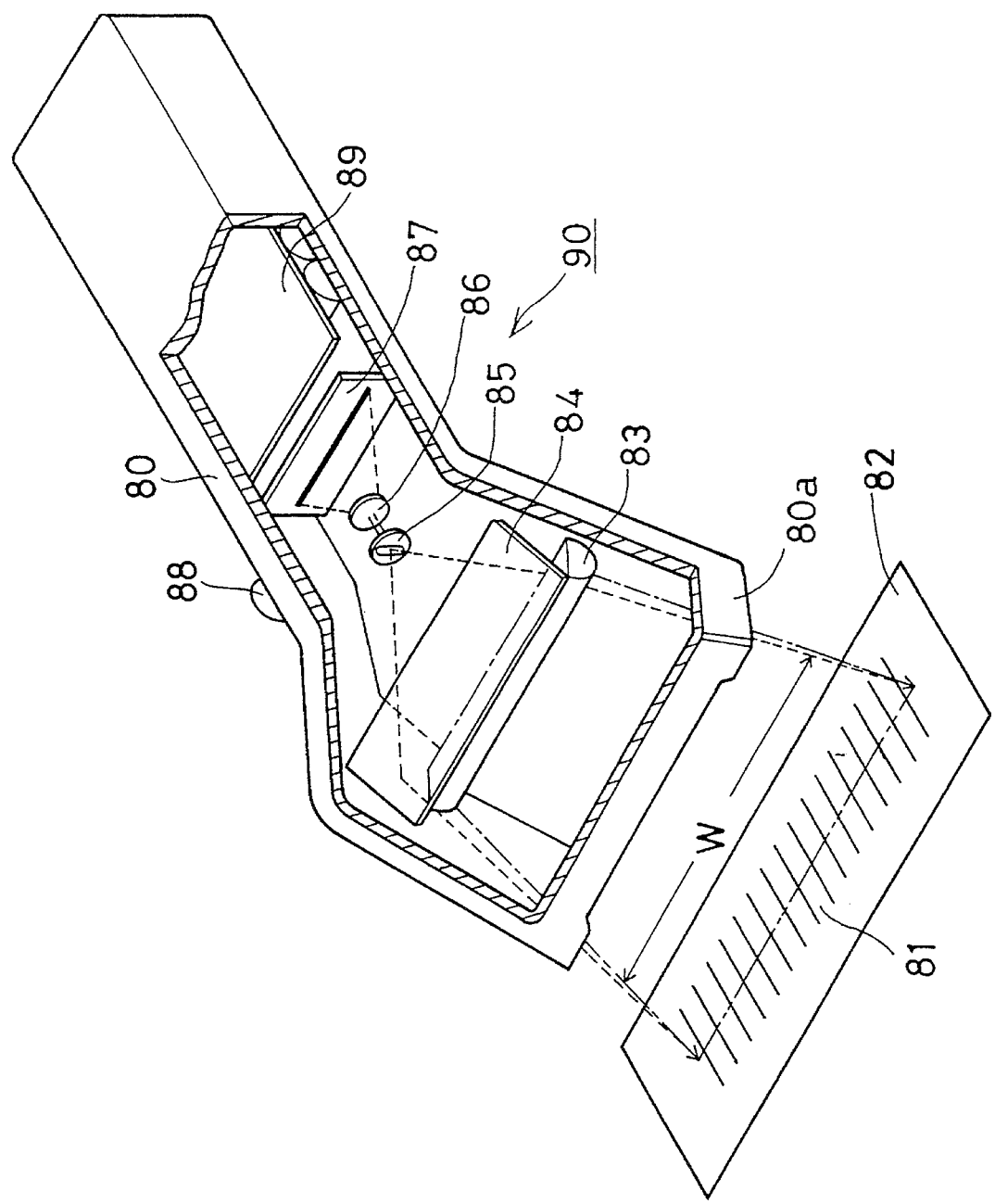
FIG. 25 is a partially broken perspective view indicating the whole construction of a conventional bar-code reader.
Figure 26:
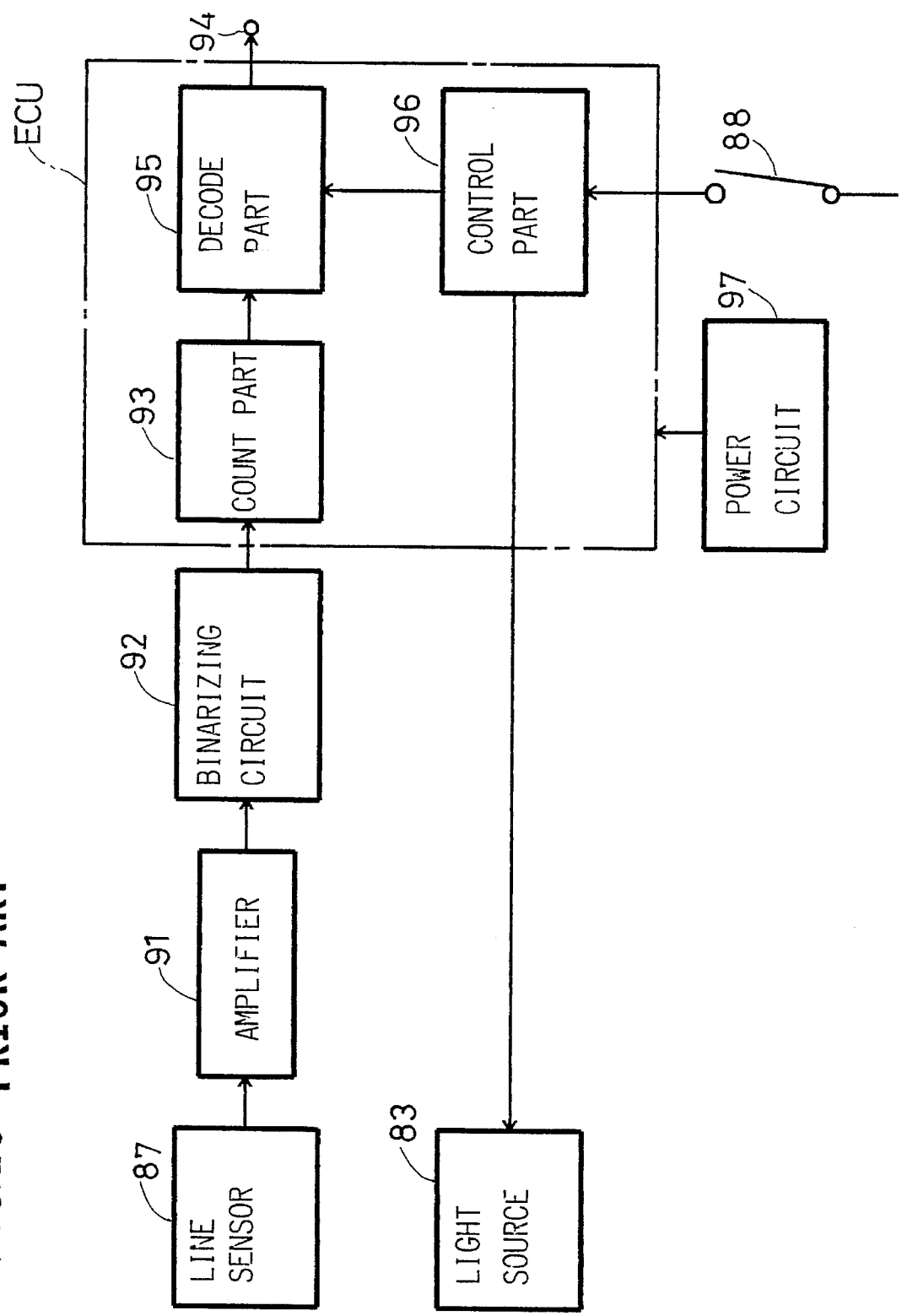
FIG. 26 is a block diagram indicating circuit construction for signal process assembled into a conventional electronic circuit board.

Like the conventional reader shown in FIG. 25, a bar-code reader of the embodiment is, as shown in FIG. 2, provided with a light source 3 for irradiating light to a bar-code label 2 on which a bar code 1 is printed, a lens 6 for converging reflected light from the bar-code label 2 through a planar reflection mirror 4 and a stop or an iris diaphragm 5 to focus an image of the bar-code label 2 on a rear portion, an image sensor or line sensor 7 arranged at a focusing position of the lens 6 for converting the image of the bar-code label 2 into an electric signal, and an electronic circuit board 10 for signal process. The bar-code reader is also provided with a wavelength detector 8 for detecting a wavelength of light included in the reflected light from the bar-code label 2 so as to enable correct reading of the bar code 1 with either a reading state (hereinafter called as a contact or touch reading state) in which the bar-code reader contacts the bar-code label 2 to read the bar code 1 or a reading state (hereinafter called as a noncontact or untouch reading state) in which the bar-code reader is separated from the bar-code label 2 to read the bar code 1. The bar-code reader is further provided with a light guide 9 for irradiating guide light indicative of a readable range of the bar code 1 to the bar-code label 2. These elements are assembled into a housing 20 integrally.

Figure 3:
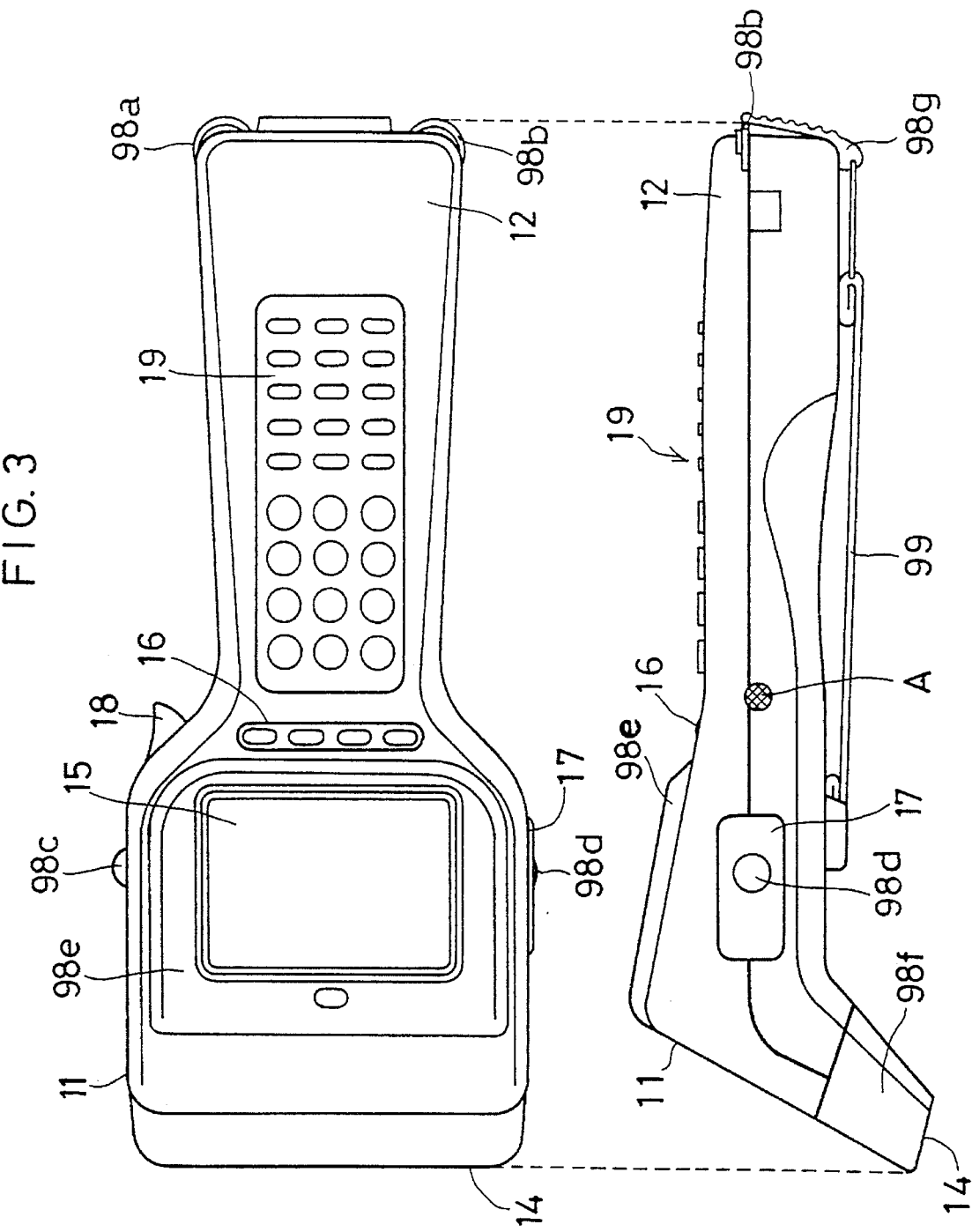
FIG. 3 is a sketch view of the bar-code reader of the embodiment.

Next, as shown in FIG. 3, the housing 20 is formed to have a head portion 11 and a hold portion 12 in a neck-bending shape. The head portion 11 of the housing 20 is opened at its top as a read opening 14. On an upper surface of the head portion 11, provided are a display panel 15 for indicating reading result of the bar code 1 or the like and a warning lamp or a warning buzzer for giving various alarms to a user. On a side surface of the head portion 11, a power switch 17 and a trigger switch 18 for inputting reading instruction are mounted. On an upper surface of the hold portion 12 of the housing 20, there is mounted an operation panel 19 for manually inputting reading condition of the bar code 1 or the like.

As a distance between the bar-code label 2 and the read opening 14 and a direction of the read opening 14 may be set by eyes so as to conform to the size of the bar code 1 in the noncontact reading state, the housing 20 is sloped at an outer wall of the head portion 11 along an angular range in which the lens 6 may focus light through the mirror 4 and stop 5, namely an angular range in which the line sensor 7 may read the bar code 1. Any protrusion is removed from an outer periphery of the head portion 11 so as to prevent obstruction to a line of user's or operator's sight.

While the housing 20 is constructed by the head portion 11 and hold portion 12, as previously described, a portion (a hold point A shown in FIG. 3) which divides the housing into these two portions is formed remarkably small as compared with the other portion. This is the reason why a user may grip the housing 20 simply at the hold point A with a basic joint portion of the thumb and basic joint portions of the remaining fingers on his palm and may also hold the point naturally, in case a user grasps the housing 20 to do reading works of the bar code 1. Weight allocation based on the hold point A is determined to make weight of the hold portion 12 identical with or heavier than that of the head portion 11 such that the head portion 11 may easily turn upwardly in case the user holds the point A. Namely, in case the housing 20 is formed by the head portion 11 and the hold portion 12 in the neck-bending shape like the embodiment, manipulation is of the same at either the contact reading state or the noncontact reading state under condition in which the bar-code label 2 is horizontally arranged. Under condition in which the bar-code label 2 is vertically arranged, however, it is necessary to turn the read opening 14 to an object by bending a user's wrist with the housing 20 held in case of the noncontact reading state. The manipulation is, therefore, bad as compared with the case of the contact reading state in which the read opening 14 may contact the bar-code label 2. Thus, in the embodiment the housing is formed to turn the read opening 14 easily in a vertical direction by setting the weight allocation based on the hold point A as previously described.

Next, construction and operation of the above-mentioned elements provided in the housing 20 will be explained.

The light source 3 is constructed by aligning a plural pieces (for instance 8 pieces) of light emitting diodes with a light emission wavelength of 660 nm (for instance light emitting diodes "trade name :"CL-170UR" manufactured by CITIZEN ELECTRON of Japan) densely at both ends of the read opening 14. In addition, the reason why the light emission diodes are aligned densely at both ends of-the read opening is to correct the phenomena that intensity of the reflected light entering into the line sensor 7 through the lens 6 lowers due to the law of $COS^4$ of the lens 6 as an incident position of the reflected light nears both ends of the line sensor 7.

Next, the mirror 4 is provided to lead reflected light from the bar-code label 2 in a direction of the stop 5. Namely, in the bar-code reader of the embodiment an optical path is changed by the mirror 4 since the housing is formed by the head portion 11 and hold portion 12 in the neck bending shape.

The stop 5 is provided to adjust a quantity of the reflected light of which optical path is changed by the mirror 4 and to lead the adjusted reflected light to the lens 6. It is necessary to deepen a depth of focus of the lens 6 because the bar-code reader of the embodiment is used in both the contact reading state and noncontact reading state. Thus, a slit of the stop 5 is set into a vertically elongated form of 0.6 mm in width and 1.7 mm in length. Namely, it is desirable to narrow the slit form for deepening the depth of focus. However, it decreases a quantity of light passing through the stop 5 to merely narrow the slit so as to strengthen a stop degree. As a result, a quantity of light entering into the line sensor 7 is decreased to result in poor influences to reading performance. From this reason, in the embodiment decrease of the light quantity is compensated by forming the slit in the vertically elongated configuration.

Figure 4:
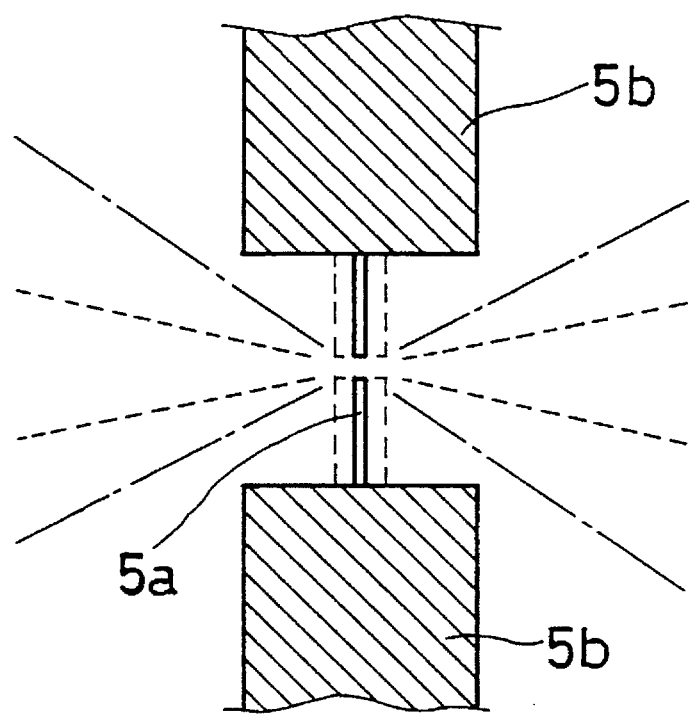
FIG. 4 is an explanatory view indicative of construction of a stop of the embodiment.
Figure 5A:
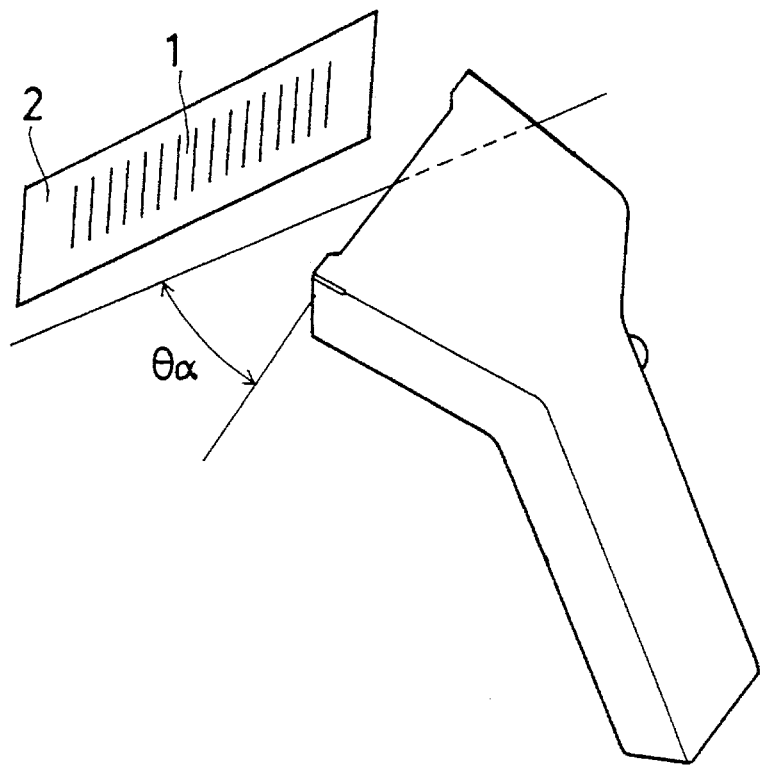
FIG. 5(a) and 5(b) are explanatory views explaining reading performance of the bar code by the stop of the embodiment.
Figure 5B:
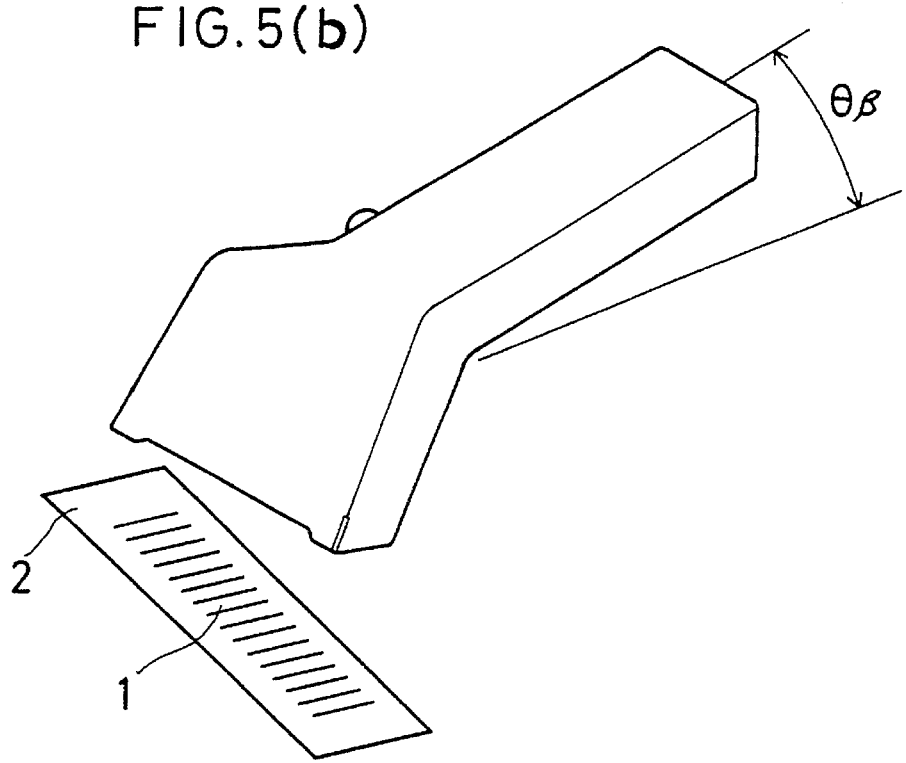

As shown in FIG. 4, the stop 5 is constructed by forming the above-mentioned vertically elongated slit 5a with a black-colored brass film of 0.3 mm in thickness and securing the film to a casing 5b made from resin of ABS or the like. Namely, in the embodiment the thickness of the slit 5a is set thinly as compared with the thickness of a conventional device shown by dotted lines in FIG. 4. Thus, it is possible to increase a quantity of reflected light passing through the slit 5a as compared with the conventional device shown by the dotted lines, as shown by dot and dash lines in FIG. 4 and also to ensure a quantity of light entering into the line sensor 7 even when the bar code is read at a slant angle of θα or θβ, as shown in FIG. 5(a) and FIG. 5(b). This enables good reading performance of the bar-code reader.

Next, as the line sensor 7, an image sensor which is constructed by arraying vertically elongated pixels in a width direction of the bar code 1 is used for reading the bar code 1. Characteristics in sensitivity of the pixels of the line sensor 7 to a wavelength of light is adjusted to become highest at red light, corresponding to the irradiating light from the light source 3. In addition, sensitivity of the line sensor 7 has no problems for practical use although it lowers in relation to natural light.

The line sensor 7 is provided with a shutter function capable of controlling a stored quantity of electric charges caused by photoelectric effect of the pixels in relation to time.

Namely, when light enters into the line sensor 7, electric charges are generated by the photoelectric effect of the pixels according to the entering light quantity. Generation of the electric charges is proportional to incident time of light. In a line sensor which is used in a conventional bar-code reader of the touch type, the electric charges are transferred sequentially by a shift register and an electric charge transfer circuit assembled in the line sensor and then are outputted to an external portion.

Since this transfer is performed at a constant speed, however, the electric charges are saturated within transfer time due to external light of which strength is high, in case of the noncontact reading state like the embodiment. Therefore, an output signal from the line sensor becomes meaningless. Thus, as the line sensor 7, used is a line sensor with the so-called shutter function in which a circuit for discharging electric charges at start of scanning interval of each pixel is closed by a control signal from an external portion and is opened with lapse of a certain time (namely, shutter control time) to enable start in generation of electric charges.

Additionally, as such an image sensor, an image sensor "trade name: HE98144" may be used which is constructed by photodiodes of the pixel number 2048 bits, for instance 200 μm in length and 14 μm in pitch and manufactured by HITACHI of Japan.

Figure 6A:
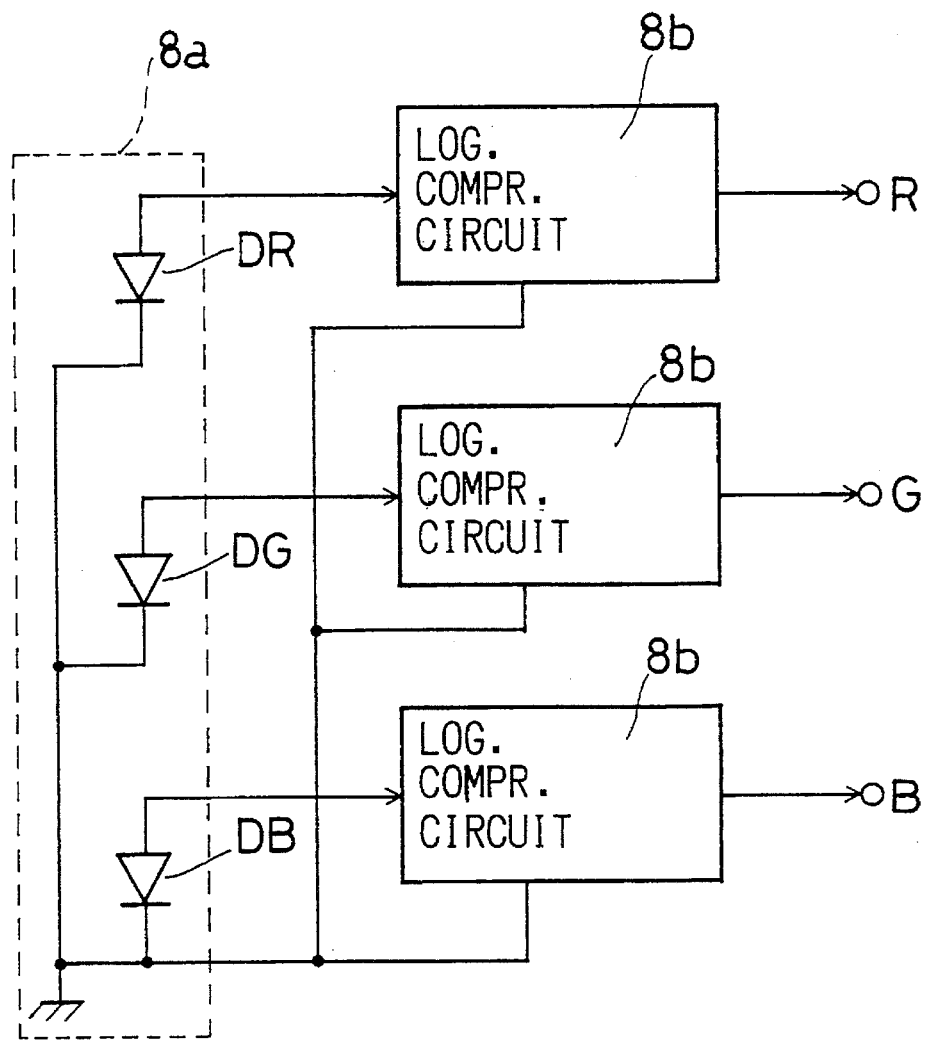
FIG. 6(a) and 6(b) are is an electric circuit diagrams indicating construction of a wavelength detector of the embodiment.
Figure 7:
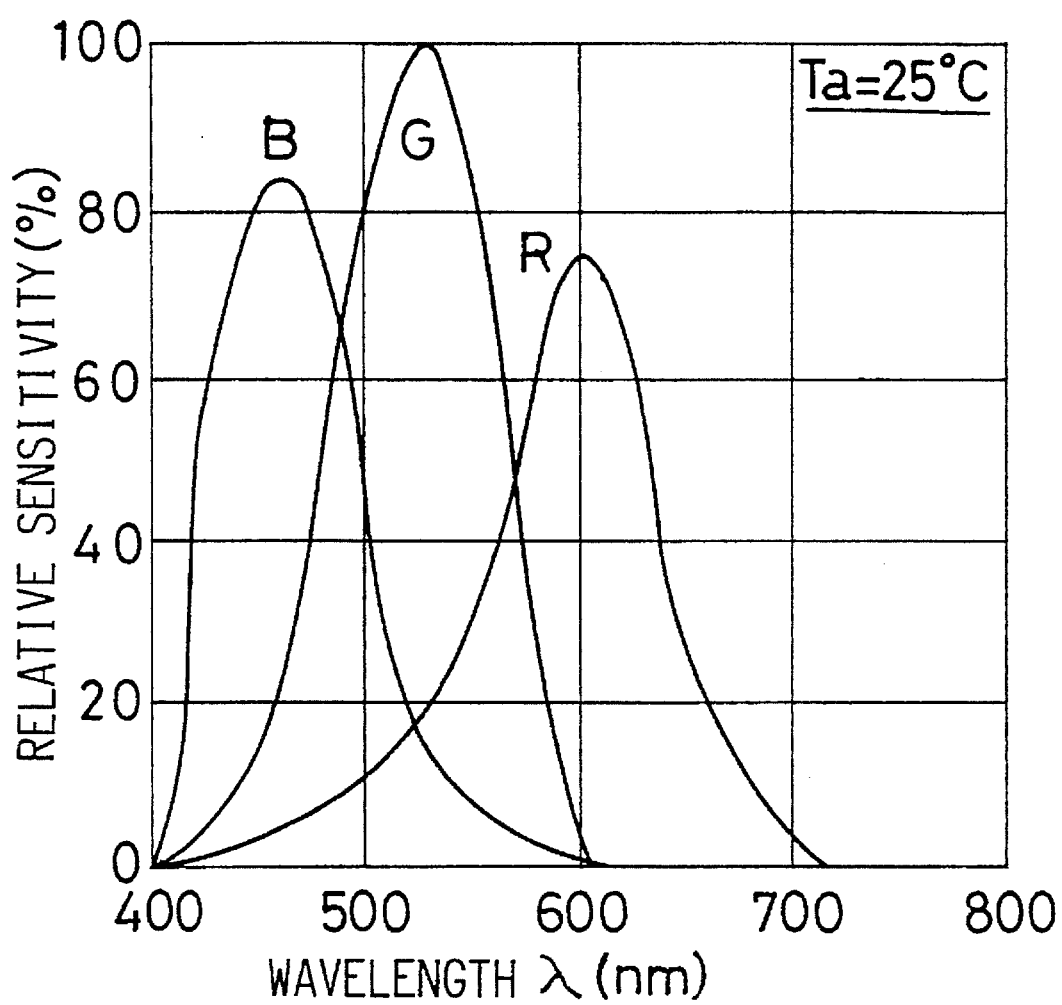
FIG. 7 is a spectral sensibility characteristic diagram of each photodiode provided in the wavelength detector of the embodiment.

Next, as shown in FIG. 6(a), the wavelength detector 8 is constructed by a color sensor 8a (for instance a color sensor "trade name:PD170V1" manufactured by SHARP of Japan) composed of three photodiodes DR, DG and DB having a peak sensitivity shown in FIG. 7 at each wavelength of R(red), G(green) and B(blue) and three logarithmic compression circuits 8b for correcting an output signal from each of the photodiodes DR, DG and DB. The wavelength detector 8 is arranged under the stop 5 as shown in FIG. 2.

Figure 6B:
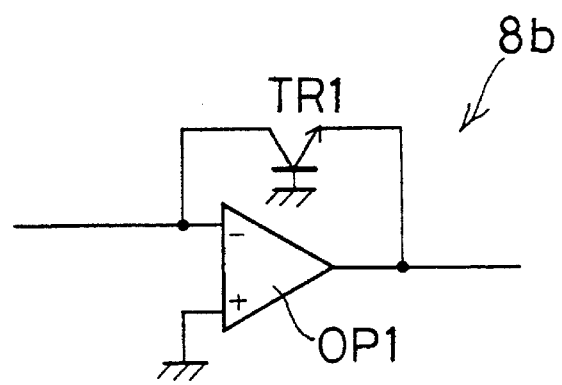

In addition, since the detecting sensitivity of each of the photodiodes DR, DG and DB changes exponentially in relation to intensity of incident light as shown in FIG. 7, the logarithmic compression circuit 8b is provided to correct the detected signal into a voltage value corresponding to the intensity of incident light and is constructed by an operational amplifier OP1 having a feedback circuit in which a transistor TR1 is connected, as shown in FIG. 6(b).

Next, the light guide 9 is constructed by a pair of high luminous light emitting diodes (for instance light emitting diodes "trade name: TLRA190P" manufactured by TOSHIBA of Japan) with 660 nm in light emission wavelength and 700 mcd in light intensity. The light guide 9 is adjusted at its optical axis and fixed to both sides of the stop 5 such that outgoing guide light forms circular light spots 9a at both sides of a readable range of the bar code 1 on the bar-code label 2, as shown in FIG. 2. Namely, the light guide 9 is provided to inform an effective readable range in case of the noncontact reading state with the light spots 9a.

Figure 8:
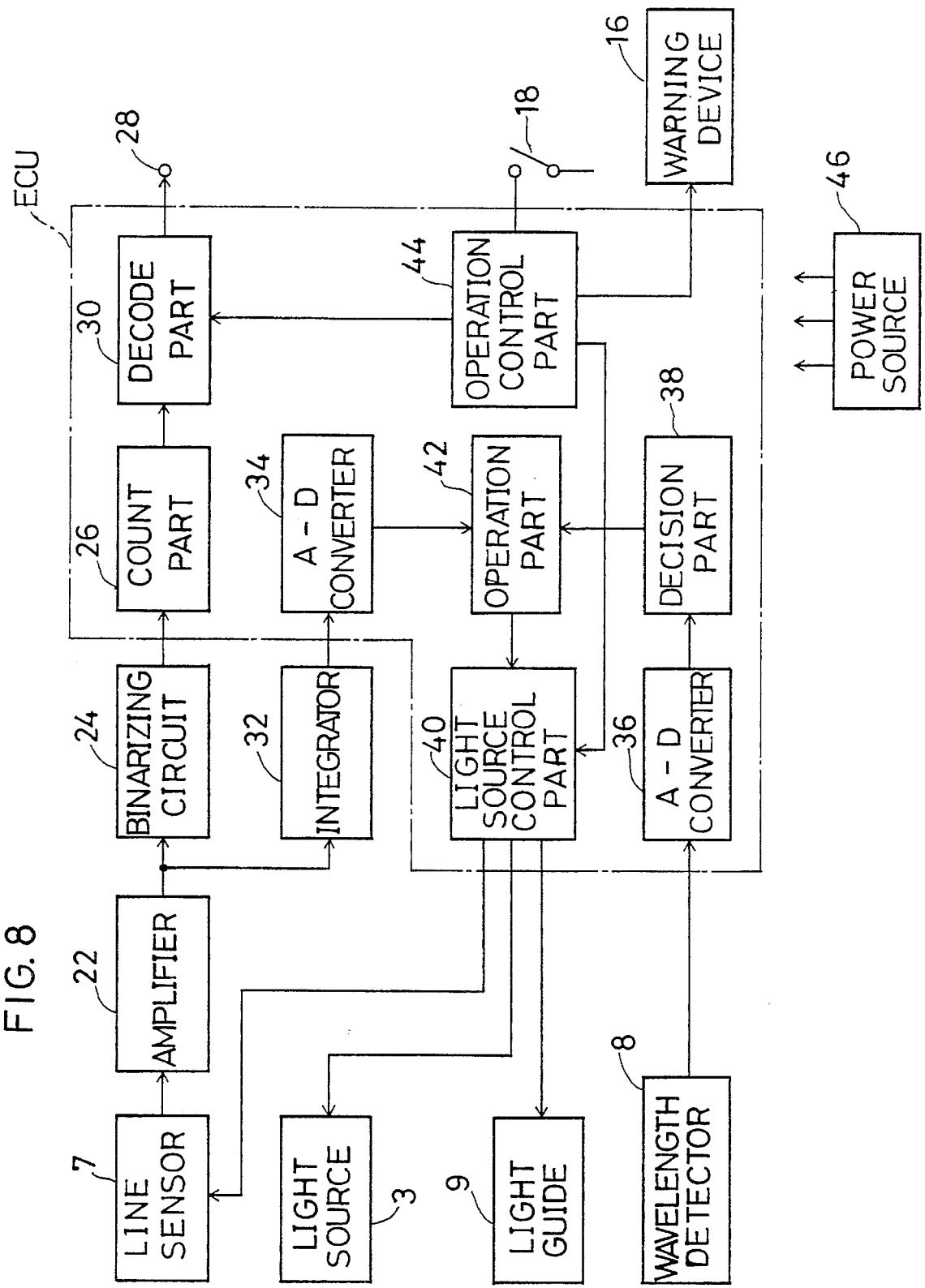
FIG. 8 is a block diagram indicating circuit construction for signal process assembled into an electronic circuit board of the embodiment.

As shown in FIG. 8, in the electronic circuit board 10, assembled are an amplifier 22, a binarizing circuit 24, a count part 26, a decode part 30, an integrator 32, an A-D converter 34, an A-D converter 36, a decision part 38, a light source control part 40, an operation part 42, an operation control part 44, a power source 46 and so on. The amplifier 22 amplifies a feeble analog image signal issued from the line sensor 7, and the binarizing circuit 24 binarizes the analog image signal amplified by the amplifier 22 with a floating binarizing method or the like to convert the binarized signal into a digital signal. The count part 26 measures widths of bars and spaces of the bar code 1 by counting a width of a digital signal issued from the binarizing circuit 24. The decode part 30 decodes the bar code 1 based on an output signal from the count part 26 to output the decoded result to an exterior portion through an external terminal 28. The integrator 32 integrates the analog image signal amplified by the amplifier 22 at every scanning time period of the line sensor 7 to detect a mean quantity of receiving light thereof. The A-D converter 34 converts a detecting signal indicative of the mean quantity of the receiving light from the integrator 32 into digital data, and the A-D converter 36 converts the detecting signal from the wavelength detector 8 into digital data. The decision part 38 decides based on the A-D converted result from the A-D converter 36 as to whether a reading state of the bar code 1 is in the contact reading state or in the noncontact reading state, and the light source control part 40 controls a light emission quantity of the light source 3 and light guide 9 and a shutter speed of the line sensor 7. The operation part 42 operates a quantity of control of the light source control part 40 on a basis of the decided result of the decision part 38 and the A-D converted result of the A-D converter 34. When reading instruction of the bar code 1 is inputted by manipulating the trigger switch 18, the operation control part 44 drives the above-mentioned parts to let the decode part 30 output the decoded result. When there is any abnormality in the decoded result, the operation control part 44 drives the warning circuit 16 to inform the user of the abnormality. The power source 46 supplies an electric power to the above-mentioned parts.

The count part 26, decode part 30, A-D converter 34, A-D converter 36, decision part 38, light source control part 40, operation part 42 and operation control part 44 are realized by the use of a microcomputer (ECU). Actually, the above-mentioned two A-D converters 34, 36 are realized by using one A-D converter installed in the microcomputer by time sharing. Additionally, this A-D converter has only to have resolving power of 8–12 bits.

Next, the integrator 32 is used to integrate an analog image signal amplified by the amplifier 22 in a scanning time period of the line sensor 7 and to detect a mean quantity of received light thereof. Therefore, as the integrator 32, used is a low pass filter or LPF which is composed of a resistor R and a capacitor C and has a time constant corresponding to the scanning time period of the line sensor 7. In addition, as the integrator 32, an active filter using an operational amplifier or the like may be used.

In general, the A-D converters installed in the microcomputer is a successive approximation A-D converter, taking account of the resolving power. In case an input level fluctuates during converting operation of such a successive approximation A-D converter, the successive approximation A-D converter may not assure converted data. Thus, a voltage hold circuit known as a sample-hold circuit is mostly provided at a front stage of the A-D converter 34 which converts the mean quantity of receiving light of the line sensor 7 scanned at a high speed into digital data. However, in the embodiment such a sample-hold circuit is not provided at the front stage of the A-D converter 34. This reason is as follows. The integrator 32 has operation similar to the sample-hold circuit since it averages a signal fluctuating due to a bar code. Thus, it is not necessary to provide the sample-hold circuit, if a converting speed of the A-D converter 34 is fast enough. In other words it is necessary to provide the sample-hold circuit at the front stage in case the converting speed of the A-D converter 34 is slow.

Next, operation of the above-mentioned parts realized as processing of the microcomputer (ECU), as previously described, will be explained with reference to FIG. 9 through FIG. 15.

Figure 9:
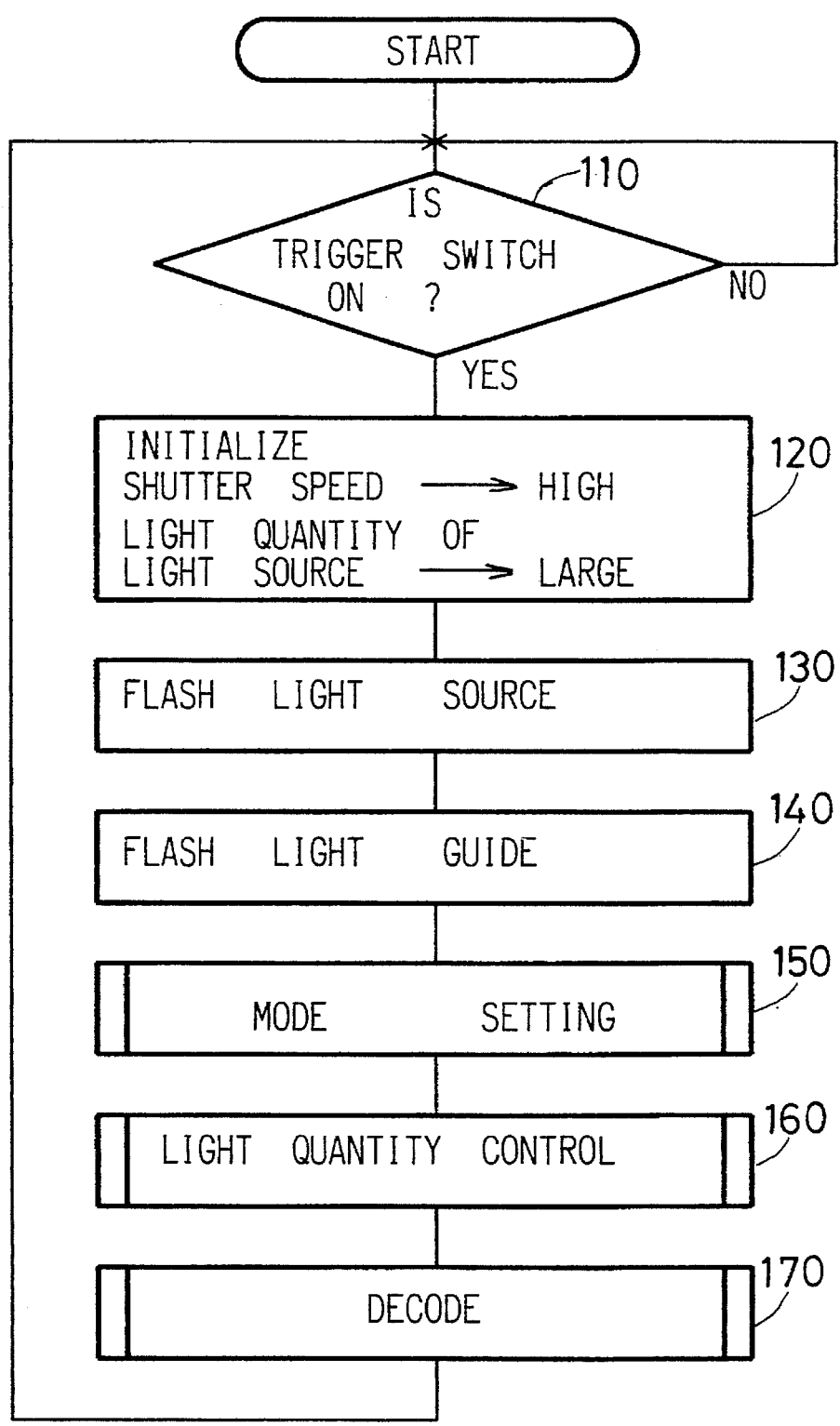
FIG. 9 is a flow chart indicative of a main routine to be executed at a microcomputer for reading of the bar code.

Firstly, FIG. 9 is a flow chart indicating a main routine to be executed repetitively by the microcomputer (ECU) for reading of the bar code 1. When the main routine is started, whether the trigger switch has been turned on or not, namely the user has inputted reading instruction of the bar code 1 or not is decided at a step 110. This step 110 is repetitively performed till the trigger switch 18 is turned on.

When the trigger switch 18 has been turned on is decided at the step 110, the main routine proceeds to the following step 120 for performing initialization for setting a light emission quantity (a light quantity of the light source) of the light source 3 and light guide 9 and a shutter speed of the line sensor 7 into maximum values. Subsequently, processing for flashing the light source 3 at the above-mentioned set light emission quantity is performed, and processing for flashing the light guide 9 at the set light emission quantity when the light source 3 is extinguished. In addition, the reason why the light source 3 and light guide 9 are alternately activated is for restricting consumption of an electric power.

When alternately flashing drive of the light source 3 and light guide 9 is started, the main routine proceeds to a step 150 wherein a reading state of the bar code 1 is decided to perform processing for automatically setting an operation mode of the reader. At the following step 160 light quantity control processing for controlling the light emission quantity of the light source 3 and light guide 9 and a shutter speed of the line sensor 7 is performed according to the set operation mode. Finally, decode processing for decoding the bar code 1 is performed based on an output signal from the binarizing circuit 24 at a step 170, the main routine proceeding to the step 110 again.

Figure 10:
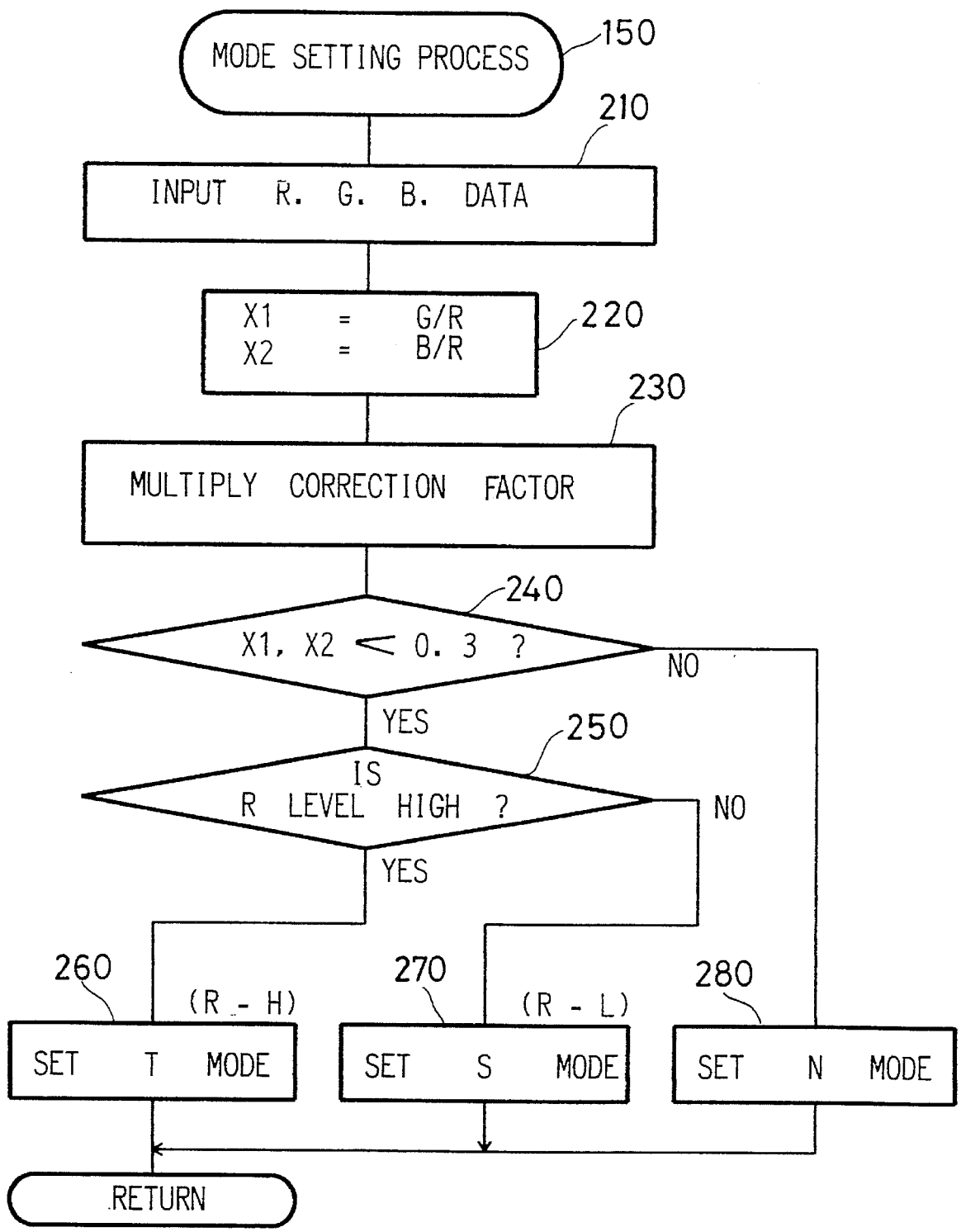
FIG. 10 is a flow chart indicating mode setting process to be executed at a step 150 of the main routine.

Next, FIG. 10 is a flow chart indicating mode setting process to be executed at the step 150. In the mode setting processing, color data (R data, G data, B data) indicating levels of colors (red, green, blue) of the reflected light from the bar-code label 2 inputted from the wavelength detector 8 through the A-d converter 36 are inputted at a step 210. Then, ratios X1 and X2 (=G/R, B/R) of the G data and B data to R data corresponding to irradiating light of the light source 3 are calculated at a step 220 by using the inputted color data, and the calculated result X1 and X2 are corrected at a step 230 by multiplying correction factors.

Namely, there is dispersion in relative sensitivity of the wavelength detector 8 to each wavelength, as understood from a spectral sensitivity characteristic graph shown in FIG. 7. Thus, at the step 230 the ratios X1 and X2 of incident light intensity of G (green) and B (blue) to incident light intensity of R(red) are correctly obtained by multiplying the obtained ratios X1 and X2 by the predetermined correction factors (for instance 0.25 against the ratio X1).

When the above-mentioned ratios X1 and X2 are corrected at the step 230, whether either one of these ratios X1 and X2 is under a predetermined value (for instance 0.3) or not is decided. When an "YES" answer is done at the step 240, the routine proceeds to a step 250 based on decision that the reflected light is not yet affected by external light. Thus, whether an R (red) level of the reflected light is high or not is decided on a basis of the R data inputted at the step 210.

When the R (red) level is high is decided at the step 250, a T mode is set as the operation mode at a step 260 based on decision that a reading state of the bar code 1 is in the contact reading state. Then the processing is ended.

When the R (red) level is low is determined at the step 250 conversely, an S mode is set at a step 270 as the operation mode based on decision that a reading state of the bar code 1 is the noncontact reading state at a gloomy place which is not affected by external light. Then the processing is ended.

Meanwhile, in case a "NO" answer is decided at the step 240, an N mode is set as the operation mode at a step 280 based on decision that external light is included in the reflected light and a reading state of the bar code 1 is the noncontact reading state at a bright place affected by the external light. Then the processing is ended.

Figure 11:
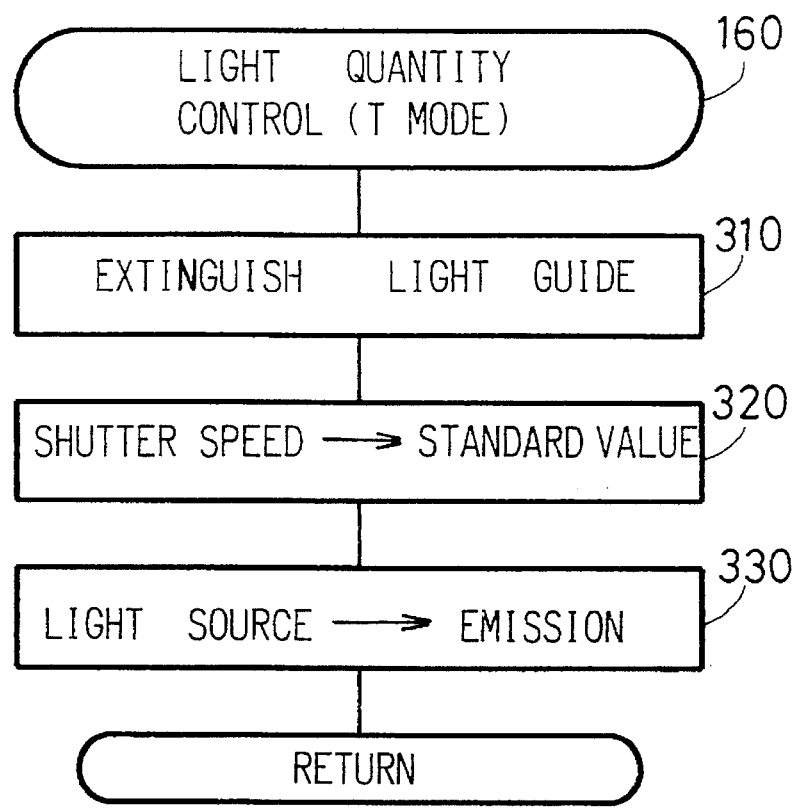
FIG. 11 is a flow chart indicating light quantity control process to be executed in case a T mode has been set at the mode setting process.

Next, FIG. 11 represents light quantity control process to be executed when the T mode has been set at the mode setting process. When the process is started as shown in FIG. 11, the light guide 9 is extinguished at a step 310 because in the T mode a reading state of the bar code 1 is in the contact reading state and guide of the readable range by the light guide 9 is unnecessary. Subsequently, a shutter speed of the line sensor 7 is set into a predetermined standard value at a step 320 because the reflected light intensity is nearly constant in case of the contact reading state. Then, at a step 330 the light source 3 is continuously lightened at a predetermined standard light emitting quantity because the light guide 9 has already been extinguished at the step 310 and there is no necessity for flashing the light source 3 so as to restrict power consumption. This process ends thereafter.

Figure 12:
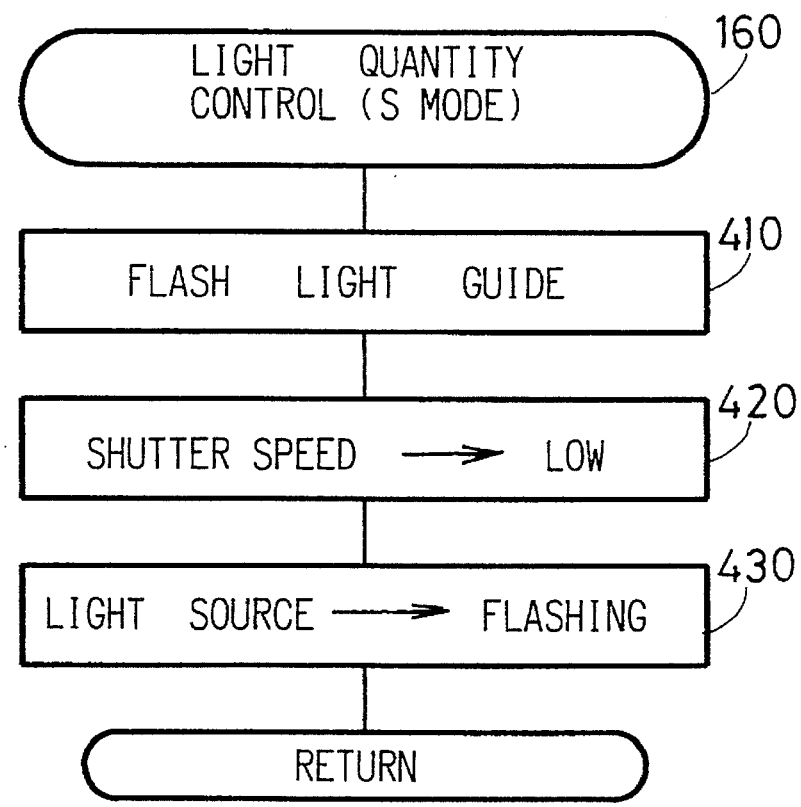
FIG. 12 is a flow chart indicating light quantity control process to be executed in case an S mode has been set at the mode setting process.

Next, FIG. 12 shows process to be executed in case the S mode has been set at the mode setting process. When this process is started, the light guide 9 is flashed at a step 410 because a reading state of the bar code in the S mode is the noncontact reading state at the gloomy place. Subsequently, at a step 420 the shutter speed is lowered for increasing the light quantity transferred photoelectrically by the line sensor 7 and at the following step 430 the light source 3 is flashed.

In addition, the light guide 9 and light source 3 are driven alternately in such S mode. For flashing the light source 3 at the step 430, therefore, the reflected light reflected from the bar-code label 2 when the light source 3 has irradiated light may be converted into an electric signal in the line sensor 7 by synchronizing the lightening timing with the scanning timing of the line sensor 7.

In the embodiment, the light guide 9 is flashed by processing at the above-mentioned step 410. However, only the light quantity from the light source 3 may act function as the light guide 9 because reading of the bar code 1 in the S mode is performed at the gloomy place. Thus, flashing of the light guide 9 is not necessary in case of the S mode and it may be eliminated to perform the processing of the above-mentioned step 410.

Figure 13:
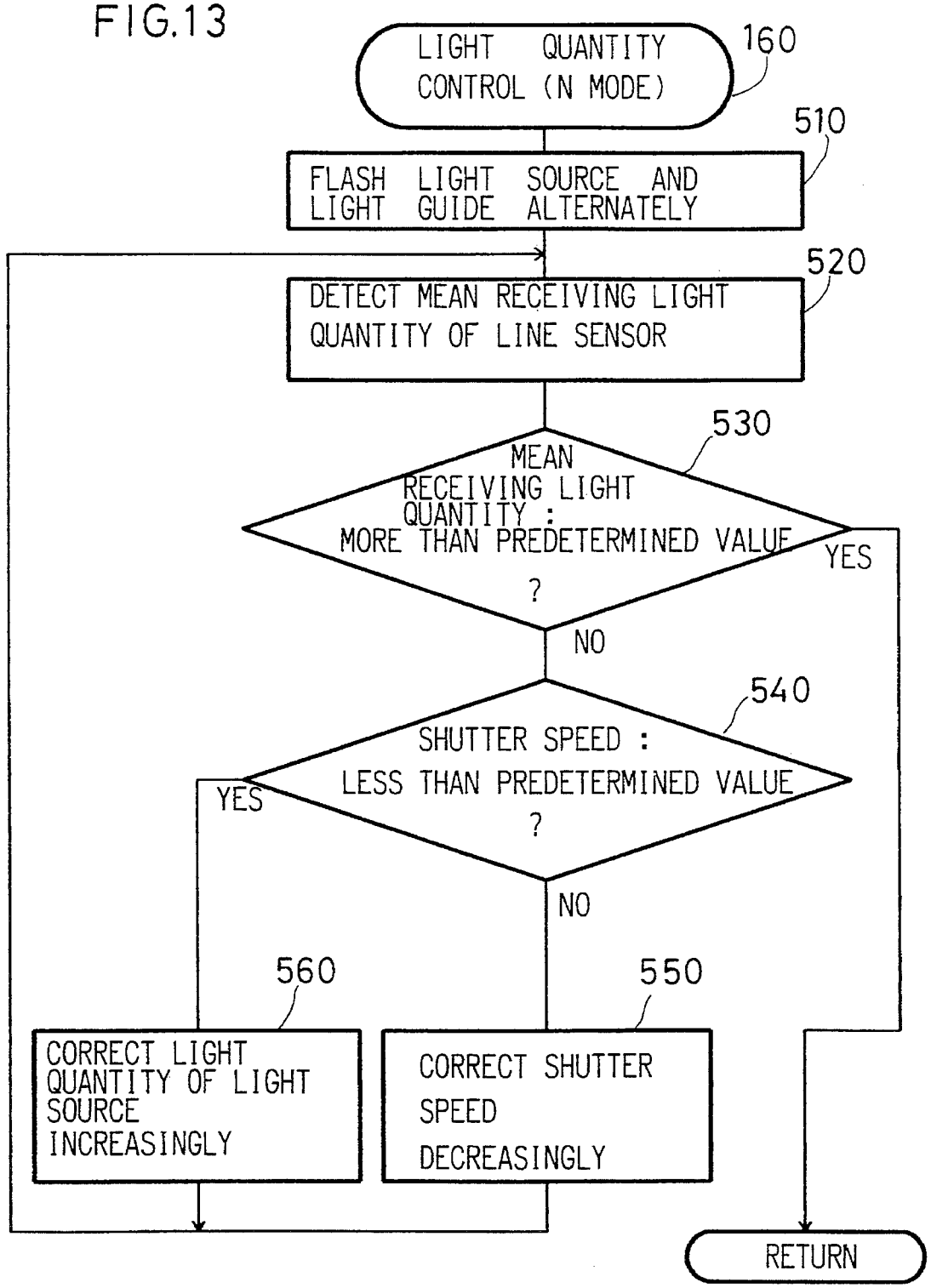
FIG. 13 is a flow chart indicating light quantity control process to be executed in case an N mode has been set at the mode setting process.

Meanwhile, FIG. 13 represents light quantity control processing to be executed in case the N mode has been set at the above-mentioned mode setting process. At a step 510 the light source 3 and light guide 9 are alternately flashed like the processing at the above-mentioned step 130 and step 140. In addition, at this step 510 the light source 3 is flashed at the minimal light emission quantity and the light guide 9 is flashed at the maximum light emission quantity. Lightening timing of the light source 3 is synchronized with the scanning timing of the line sensor 7.

At the following step 520 the mean light receiving quantity of the line sensor 7 is inputted from the integrator 32 through the A-D converter 34. Subsequently, whether the mean receiving light quantity of the line sensor 7 inputted at the step 520 is more than a predetermined value or not is determined at a step 530, and the processing ends if the mean receiving light quantity is more than the predetermined value. In addition, the line sensor 7 is not saturated because the light emission quantity of the light source 3 is set into the minimum value immediately after start of the processing and the shutter speed of the line sensor 7 is set into the maximum. Thus, a "NO" answer is surely determined at the step 530.

In case the mean receiving light quantity of the line sensor 7 is not more than the predetermined value at the step 530, whether a shutter speed of the line sensor 7 is less than a predetermined value is decided at a step 540. If the shutter speed is not less than the predetermined value, the shutter speed is decreased by a predetermined speed at a step 550, the routine returning to the step 520 again. If the shutter speed is less than the predetermined value conversely, the light emission on quantity of the light source 3 is increased by a predetermined quantity, the routine returning to the step 520 again.

That is, reading of the bar code 1 in the N mode is done under the noncontact reading state at a bright place in which external light is included in the reflected light. Thus, a width (dynamic range) of the reflected light intensity is very wide. As a result, for correctly reading the bar code 1 with the line sensor 7 it is needed to interlock the shutter speed of the line sensor 7 with the light emission quantity of the light source 3 and to control in an optimum value the light receiving quantity transferred photoelectrically by the line sensor 7.

A detection signal (voltage) Vo indicative of a receiving light quantity of the line sensor 7 to be outputted from the integrator 32 is written as the following equation 1 according to an irradiating light quantity function Lf (ix) indicating how a light emission quantity of the light source 3 changes against a driving current ix, a light emission quantity function Gf (ig) indicating how the light emission quantity changes against a driving current ig of the light guide 9, a light-signal conversion constant $\delta$ in the line sensor, a reflection factor Bcps of the bar-code label, external light (natural light) illuminance N1, a transfer loss factor H of light and a shield light function Sf (f) for a shutter speed t:

$Vo = \delta \times Sf(t) \times Bpcs \times H^2(Lf(ix) + Gf(ig)) + N1$, wherein $Sf(t)$ indicates an inversely proportional function and $Gf(ig)$ indicates a proportional function.

Moreover, the light guide 9 is extinguished at the read scan timing of the line sensor 7 in the embodiment. Accordingly, the irradiating light quantity function Lf(ix) and shield light function Sf(f) have only to be controlled for controlling the detection signal (voltage) Vo into an optimum value.

Thus, in the embodiment the shutter speed t and the light emission quantity of the light source 3 (concretely the drive current ix) are controlled in order to obtain a proper output in the line sensor 7 in the above-mentioned N mode light quantity control process.

Figure 14:
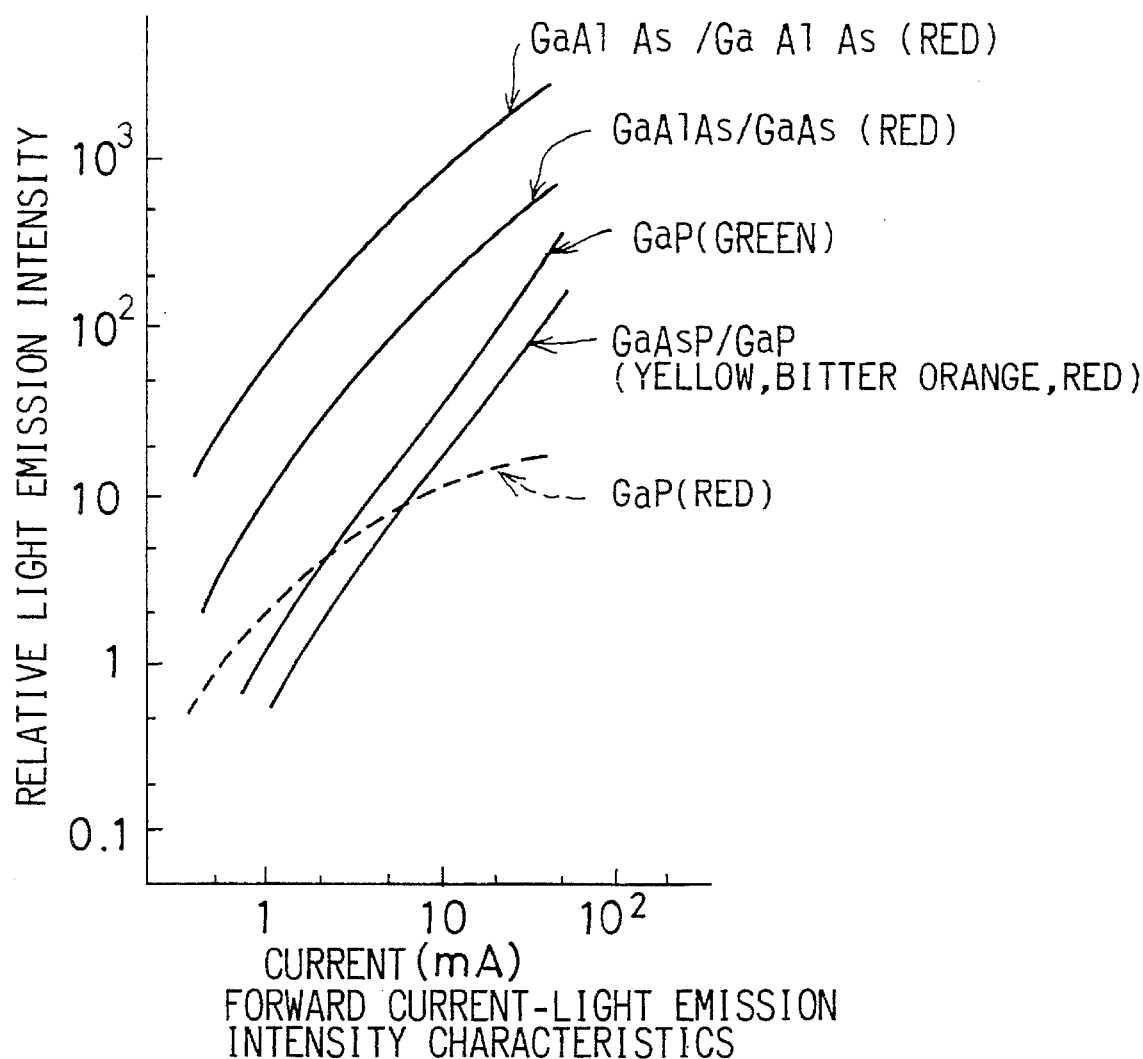
FIG. 14 shows forward current-light emission intensity characteristics which represents relationship between light emission quantity (light emission intensity) of the light source and a drive current thereof.

As clearly understood from a forward current-light emission intensity characteristics shown in FIG. 14, the light emission quantity of the light source 3 and the drive current ix therefor are not linearly proportional with each other and change exponentially. Thus, the drive current ix of the light source 3 is controlled by using a map approximated linearly to the irradiating light quantity function Lf(ix), when the light emission quantity of the light source 3 is controlled at the step 560.

The reason why in this control the shutter speed control is preferentially performed and the light emission quantity of the light source 3 is increased only in case the shutter speed becomes less than a predetermined value is to restrict the power consumption. In this case, the reason why the shutter speed is not made a minimum value is as follows. When the shutter speed is minimized (that is, when charge storage time in the line sensor is made long) due to for instance shortage of the irradiating light quantity, there is possibility influenced by movement of a hand or the like. This influence shades an information image of the bar code focused on the line sensor 7, resulting in lowering of reading performance.

Figure 15:
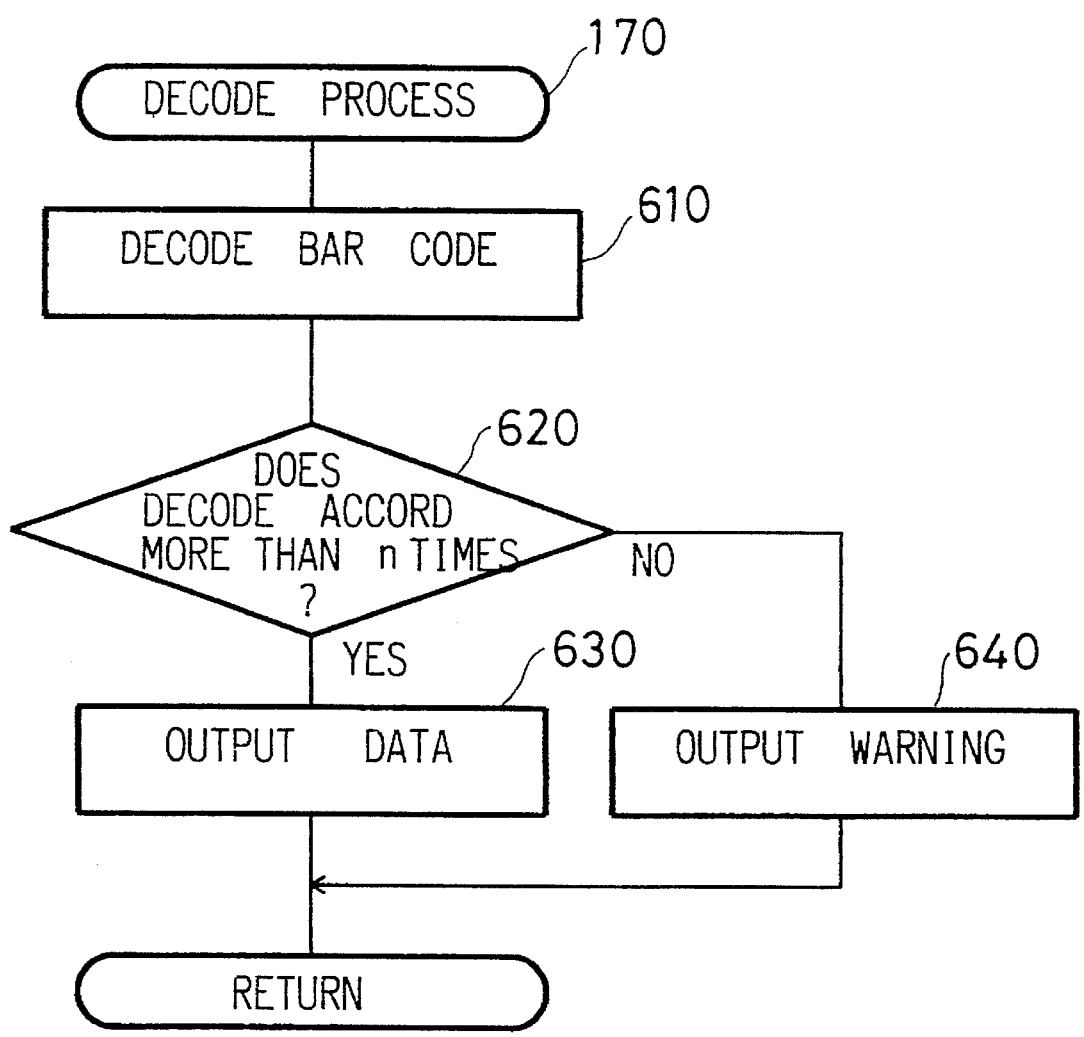
FIG. 15 is a flow chart indicating decode process to be executed at a step 170 of the main routine.

Next, FIG. 15 is a flow chart indicating decode processing to be executed at the above-mentioned step 170. In the decode processing shown in FIG. 15, the bar code 1 is decoded in plural times through process in which widths of bars and spaces of the bar code 1 are measured at a step 610 by counting output signals from the binarizing circuit 24 to decode information of the bar code 1 from combination of the measured widths. At the following step 620 whether the bar code 1 has been correctly read or not is determined by determining whether the decoded results accord or coincide with each other in more than a predetermined n times or not.

When the bar code 1 has been correctly read at the step 620, the routine proceeds to a step 630 wherein data indicative of the decoded result is outputted from an external terminal 28 and the processing is ended. When bar code 1 could not have correctly been read, conversely, the routine proceeds to a step 640 wherein the warning circuit 16 outputs warning instruction. Then, the processing is ended.

As described above, in the bar-code reader of the embodiment, a reading state of the bar code 1 is determined to determine the operation mode. Then, the light source 3, the light guide 9 and the shutter speed of the line sensor 7 are controlled in accordance with each operation mode such that the light receiving quantity transferred photoelectrically by the line sensor 7 becomes an optimum value.

Thus, with the bar code reader of the embodiment the contact reading state wherein the bar code 1 is read by keeping the read opening 14 apart from the bar-code label 2 may be realized. As the result, it becomes possible to read the bar code 1 with a width W1 wider than an opening width W of the read opening 14, as shown in FIG. 2.

In case of the contact reading state of the bar code 1 in the embodiment, the light guide 9 is flashed to indicate the readable range of the bar code 1 on the bar-code label 2. Thus, the user may simply recognize the readable range and manipulation of the bar-code reader may be improved.

Furthermore, in the embodiment the outer wall of the head portion 11 is sloped along the readable angle. Thus, the read opening 14 may be arranged at a desired position by aiming effect of the head portion 11 even when reading work is done at an extremely bright place difficult in looking at guide light irradiated by the light guide 9.

Figure 16A:
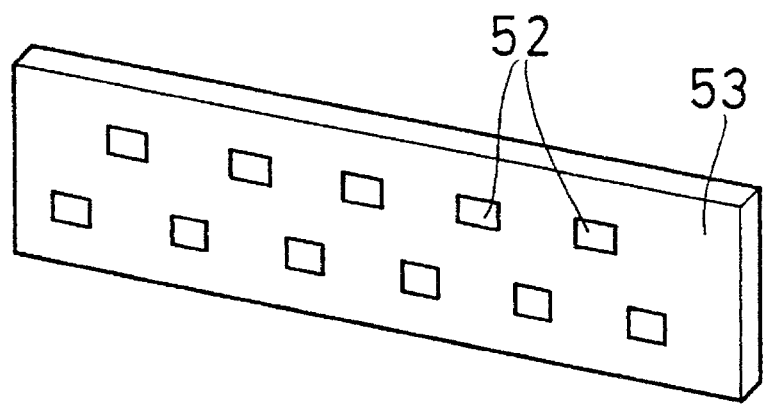
FIG. 16(a) and 16(b) are explanatory views explaining an example of other construction of the light source and operation thereof.
Figure 16B:
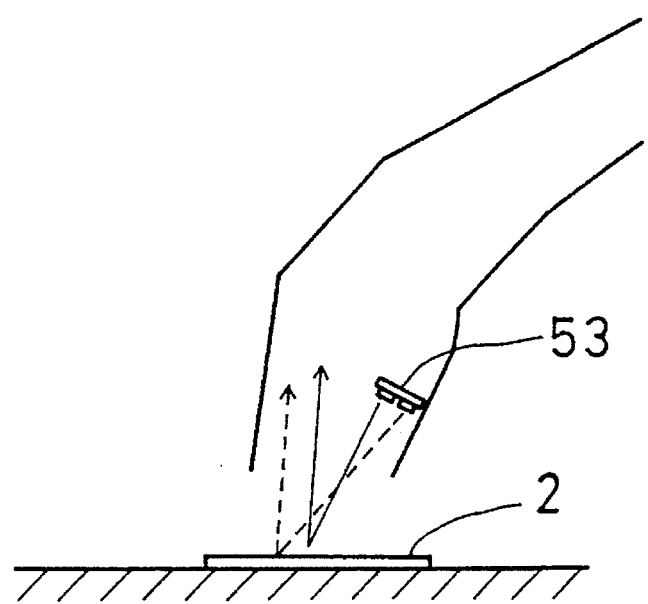

In the above-mentioned embodiment, a light source which is constructed by a plurality of aligned LED chips is used as the light source 3. However, the light source 3 may be replaced with a light source 53 constructed by a plurality of LED chips 52 which is lined up in two rows, for instance as shown in FIG. 16(*a*) such that optical axes or light directions of the respective rows of the LED chips 52 are different with each other as shown in FIG. 16(*b*). With this modification, even if irradiating light from the one row of the LED chips is specularly reflected on the bar-code label 2, it is possible to read the bar code 1 with irradiating light from the other row of the LED chips. This enables more improvement of reading performance.

In this case, the total number of the LED chips 52 may be increased as compared with a single row arrangement or may be the same number as that of the LED chips in the single row arrangement with the number of the LED chips per a row decreased in a half. Furthermore, the LED chips 52 may be alternately emitted every rows or may be simultaneously emitted. However, for more surely preventing influences of the mirror reflection it is desirable to emit the LED chips 52 alternately at every row and also to perform decode processing at every row.

Figure 17:
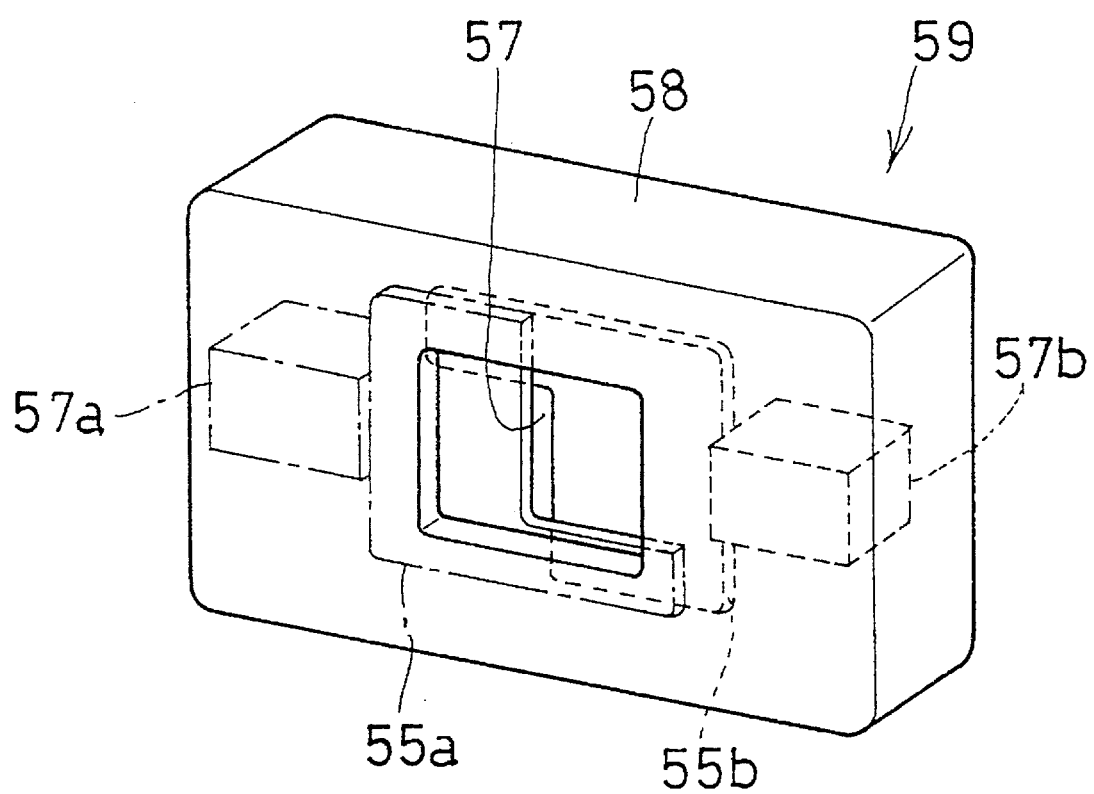
FIG. 17 is an outlined construction view indicative of an example of other construction of a stop.

In the above-mentioned embodiment, a stop of which a slit width is fixed is used as the stop 5. However, the stop 5 may be replaced with a variable stop 59 which is constructed by two stop plates 55*a*, 55*b*, piezoelectric elements 57*a*, 57*b* for moving the stop plates 55*a*, 55*b* in a width direction of the slit 56, and a holder 58 accommodating integrally these elements therein, as shown in FIG. 17.

In this case, the width of the slit 56 may be varied by driving the piezoelectric elements 57*a*, 57*b*. Thus, the light receiving quantity transferred photoelectrically by the line sensor 7 may be controlled by the stop. As a result, it becomes possible to further improve reading performance of the bar code 1. Namely, in the above-embodiment the stop is determined largely because it is necessary to deeply take depth of focus in case of the contact reading state. However, this decreases the receiving light quantity. As the result, there occurs the case in which the light quantity enough for the line sensor 7 may not be ensured in case of the S mode in which contact reading is done at the gloomy place. However, the light quantity may be ensured by controlling the stop in a release direction with the variable stop 59. This leads to more improvement of reading performance of the bar code 1.

In the above-mentioned embodiment a light guide which irradiates light with the same wave length as that of the light source 3 is used as the light guide 9. Thus, it is possible to irradiate both ends of the bar code 1 with the light spots 9*a* if the light source 3 and light guide 9 are simultaneously turned on with the power consumption sacrificed. This may compensate decrease of the light receiving quantity caused by the law of $COS^4$ of the lens 6 at both sides of the bar code 1.

Figure 18:
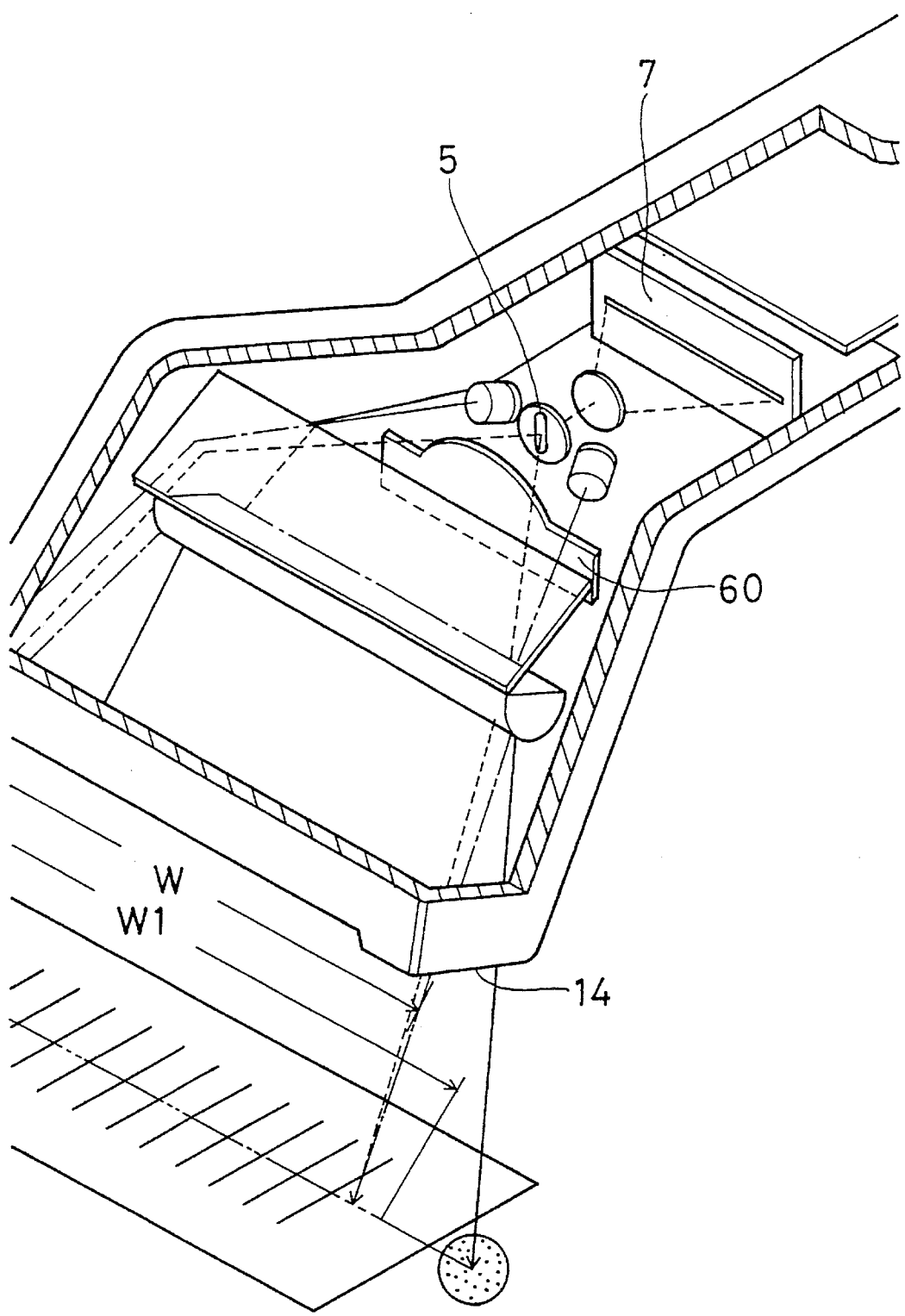
FIG. 18 is an outlined construction view indicative of construction in case a shield light plate is mounted on an optical path of reflected light from the bar code.

For evading influences given by the law of $COS^4$ of the lens 6, a shield light plate 60 with shield light characteristic conforming to the law of $COS^4$ may be arranged on an optical path of reflected light which reaches the stop 5 from the reading opening 14, as shown in FIG. 18. In this case, the light quantity entering into the line sensor 7 is shielded such that the entering light quantity increases as the entering point of the light approaches from the center of the line sensor 7 to the ends of the line sensor 7. Thus, it becomes possible to enter constant reflected light into the line sensor 7.

In case a light source constructed by a plurality of high luminous LEDs is used as the light source 3 and a luminous shape of the light source is set in a line shape as shown in FIG. 19(*a*), it is possible to use the light source both as the light guide 9 and the light source 3. In this case, since irradiating light is formed in the line shape as shown in FIG. 19(*b*), the user may recognize a readable range of the bar code 1 from the shape of the irradiating light. Furthermore, it is possible to simplify assembling works add wiring, since there is no necessity for accommodating the light source 3 and light guide 9 into the interior of the housing 20.

Figure 20A:
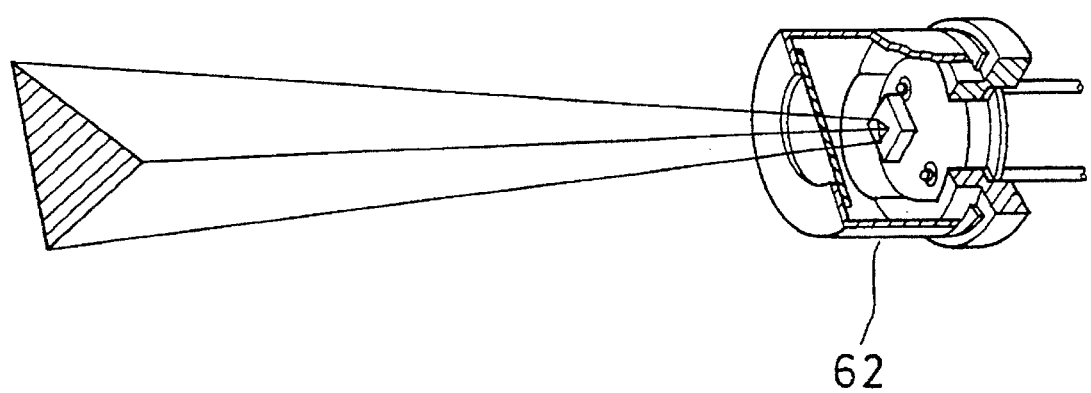
FIG. 20(a) and 20(b) are explanatory views explaining construction and its operation of a light guide in case light spot form of the light guide is triangular.
Figure 20B:
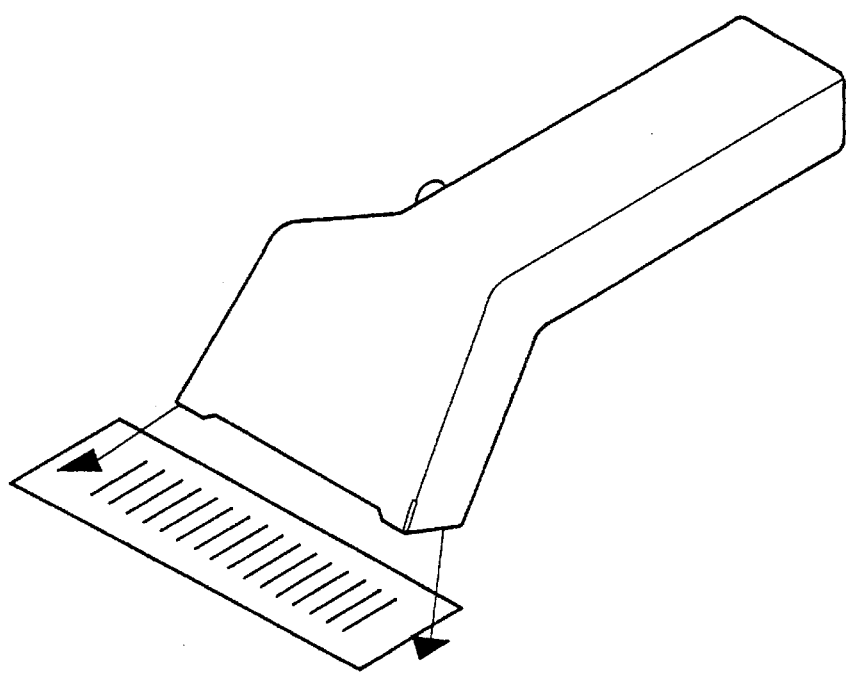

Furthermore, a high luminous LED forming a circular light spot 9*a* is used as the light guide 9 in the embodiment. However, the light guide 9 may be replaced with a high luminous LED 62 forming a triangular light spot, as shown in FIG. 20(*a*). This enables more intelligible guide for the readable range of the bar code 1, as shown in FIG. 20(*b*). In addition, as such a high luminous LED, used is a high luminous LED which is manufactured by OMRON of Japan and published in the literature "660 nm GaInP high output LED having a minute emission diameter, the applied physics society, 1992 spring 29-P-R-14 preliminary manuscript".

For more intelligible guide of the readable range of the bar code 1, a wavelength of guide light irradiated by the light guide 9 may be set into a value (for instance a wavelength of green color) different from a wavelength of irradiating light from the light source 3.

Figure 21:
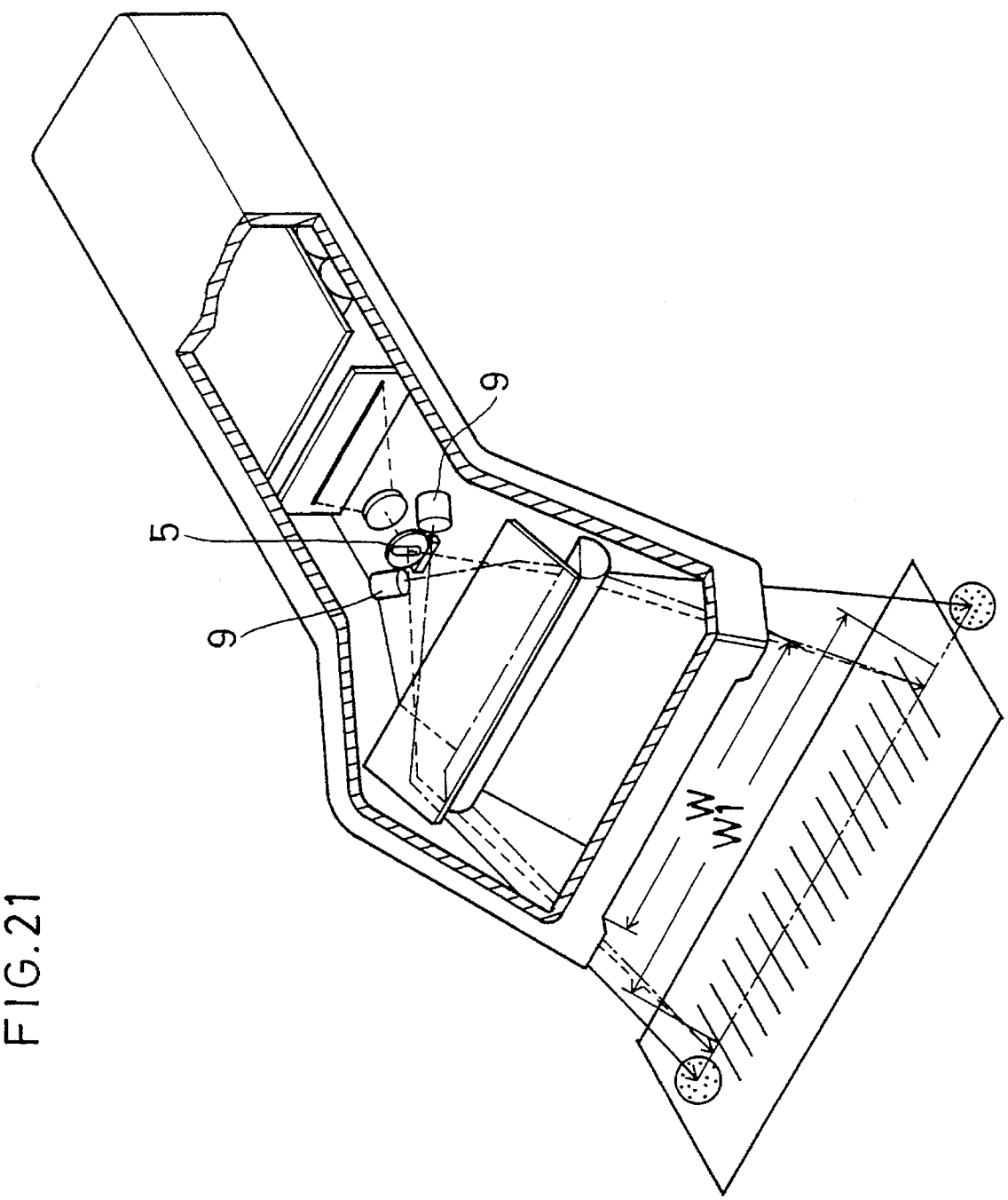
FIG. 21 is an outlined construction view indicative of arranged condition of the light guide in case guide light of the light guide is crossed with each other.

Furthermore, in the above-mentioned embodiment, a pair of the light guides 9 are provided on both sides of the stop 5, and each optical axis of the light guides 9 is adjusted such that the left side light guide 9 irradiates the left end of the readable range and the right side light guide 9 irradiates the right end of the readable range. However, each optical axis of the light guides 9 may be crossed such that the left side light guide 9 irradiates the right end of the readable range and the right side light guide 9 irradiates the left end of the readable range, as shown in FIG. 21.

Figure 22A:
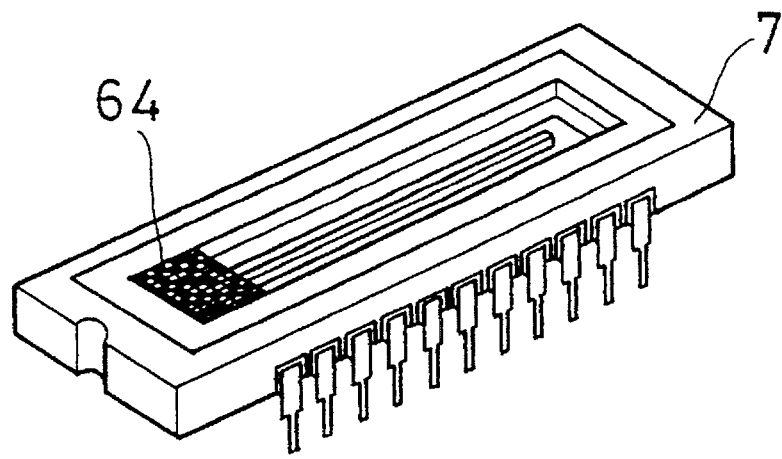
FIG. 22(a) and 22(b) are explanatory views explaining an example of construction of a line sensor in case the line sensor is given function as the wavelength detector.
Figure 22B:
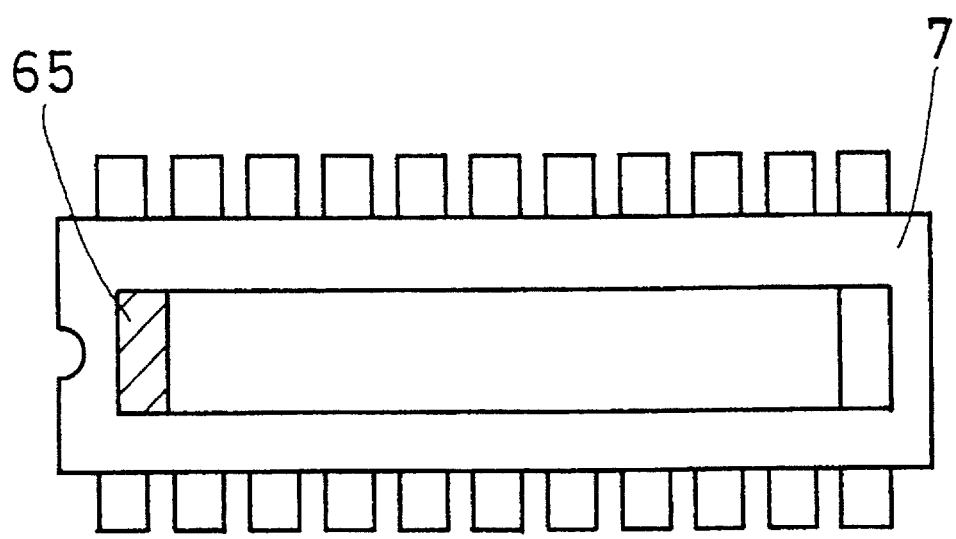

In the above-mentioned embodiment, a so-called color sensor is used as the wavelength detector 8 for discriminating the contact reading state and the noncontact reading state. In case a color filter 64 corresponding to R(red), G(green) and B(blue) is secured to an end of the line sensor 7, as shown in FIG. 22(*a*) and a light receiving element located at the end of the line sensor 7 is used as the wavelength detector 8, it is possible to perform wavelength detection without any color sensor mounted especially. In this case, although spectral characteristics of the line sensor 7 have large influences, they may become usable by matching the characteristics of the color filter 64 to the line sensor 7. A pixel in itself located on an end of the line sensor 7 may be given the same characteristics as those of the wavelength detector 8 and be used as a wavelength detector 65, as shown in FIG. 22(*b*).

Figure 23:
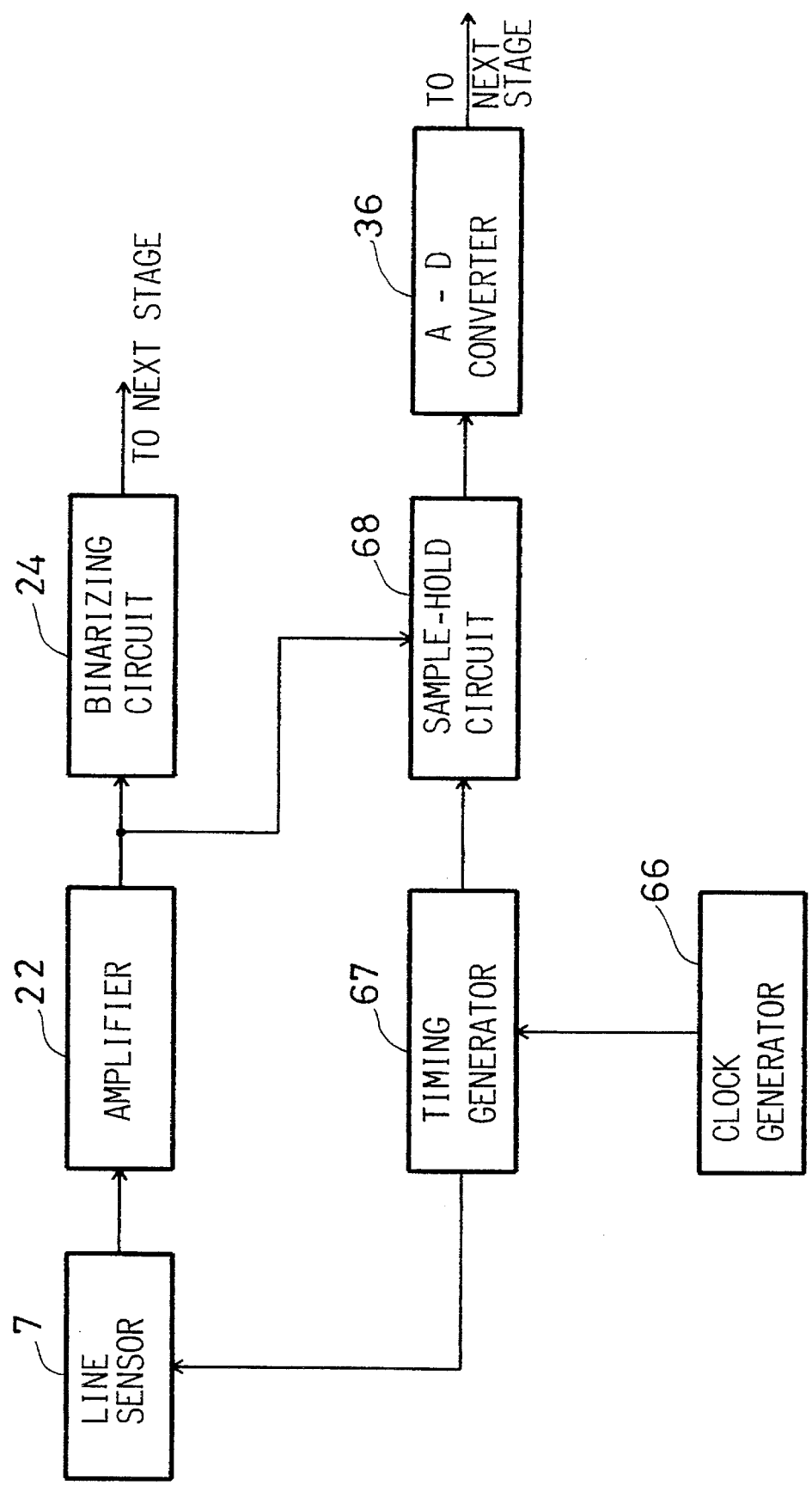
FIG. 23 is a block diagram indicative of circuit construction in case the line sensor is given function as the wavelength detector.

The line sensor 7 outputs serial analog signals corresponding to signals from a clock generator 66 for driving the line sensor 7. In case the line sensor 7 in itself is given function as the wavelength detector 8 with use of the color filter as previously described, a timing generator 67 is, as shown in FIG. 23, provided to generate a signal for scan timing control of the line sensor 7 on a basis of a signal from the clock generator 66 and to generate an output timing signal indicative of the corresponding pixel. A sample-hold circuit 68 is provided to sample and hold an output signal from an amplifier 22 in response to the output timing signal from the timing generator 67. Thus, a signal which corresponds to each color and is held by the sample-hold circuit 68 is applied to an A-D converter 36.

Meanwhile, it is not always necessary to detect a wavelength of the reflected light for discriminating the contact reading state and the noncontact reading state. For instance, it may be also realized by executing mode setting process as shown in FIG. 24.

Figure 24:
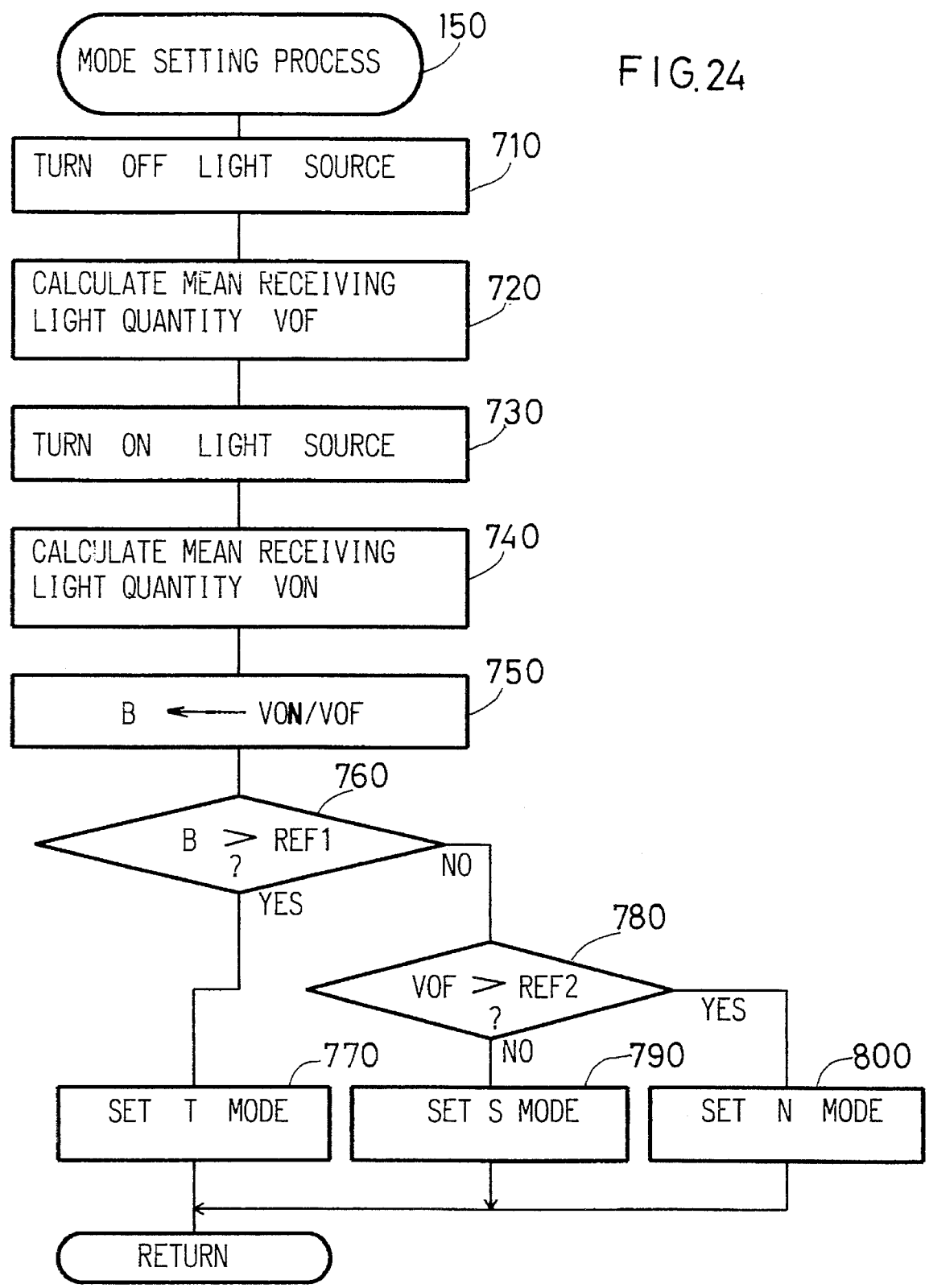
FIG. 24 is a flow chart indicative of mode setting process for determining a reading state of the bar code without detection of a wavelength of reflected light.

As shown in FIG. 24, the light source 3 is turned off at a step 710, a mean received light quantity VOF of the line sensor 7 from the integrator 32 is read at a step 720, the light source 3 is turned on at a step 730, and a mean received light quantity VON of the line sensor 7 from the integrator 32 is read at a step 740. Then, a ratio B of the mean received light quantities VON, VOF is calculated at a step 750, whether the ratio B is larger than a reference value REF1 or not is determined at a step 760, and the T mode is set as an operation mode at a step 770 when the ratio B is larger than the reference value REF1.

When the ratio B is less than the reference value REF1, whether the mean received light quantity VOF upon turning off (or turning on) of the light source 3 exceeds a reference value REF2 or not is determined at a step 780. If the mean received light quantity VOF does not exceed the reference value REF2, the S mode is set as the operation mode at a step 790. If the mean received light quantity VOF exceeds the reference value REF2, the N mode is set as the operation mode at a step 800.

Namely, the ratio B becomes very large (about infinity) because the mean received light quantity upon turning off of the light source 3 becomes about zero in case of the contact reading state. Meanwhile, the ratio B becomes small as compared with the case of the contact reading state due to influences of the external light even if gloomy in case of the noncontact reading state. Furthermore, it is possible to determine, based on the magnitude of the mean received light quantity VOF (or VON), as to whether the contact reading is done when the circumference is gloomy or when the circumference is bright. Therefore, it is possible to decide the contact reading state, the noncontact reading state and the strength of the external light on a basis of the ratio B and the mean received light quantity VOF (or VON) and also to set the operation modes of T, S and N, as previously described.

As shown in FIG. 3 in the above-mentioned embodiment, shock absorbing portions 98*a*, 98*b*, 98*c*, 98*d*, 98*e*, 98*f* and 98*g* made of such soft material as rubber, nylon or the like are arranged on an outer periphery of the head portion 11 and hold portion 12. In order to absorb shocks given to the bar code reader when the bar code reader is dropped on a surface of a floor, these shock absorbing portions are mounted on a portion which will clash earliest on the surface of the floor in relation to the shape of the bar code reader.

In addition, a belt 99 provided on a bottom surface of the bar code reader is used for holding the bar code reader on a hand of operator in operation of an operation panel 19. The shock absorbing portions 89*a*, 89*b* are not only used as shock absorbers as previously described but also used as rings for securing the belt 99 to the bar code reader. This common use reduces the number of parts.

Figure 33:
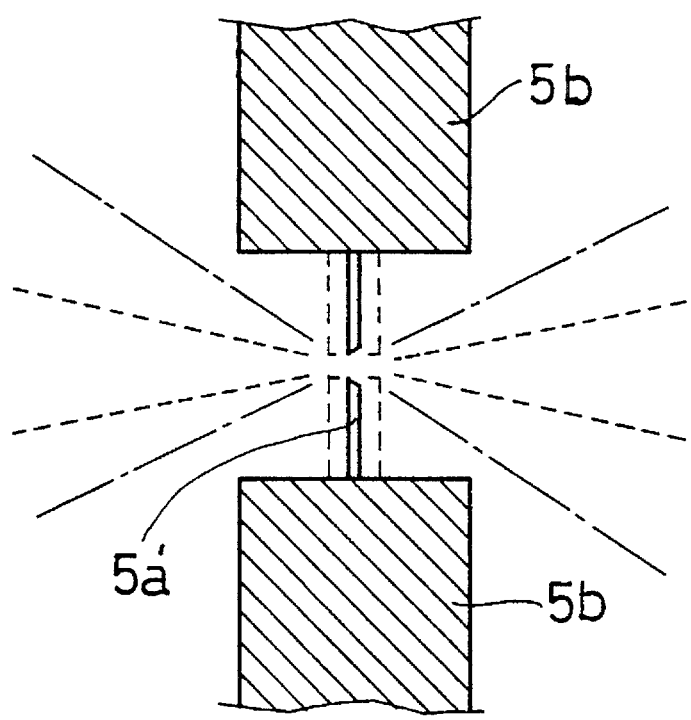
FIG. 33 is an explanatory view indicative of other construction of the stop.

Furthermore, the vertically elongated slit 5*a* of the stop 5 shown in FIG. 4 may be replaced with a slit 5*a*' of which a tip has a cut-out portion cut out only toward the outgoing side of light, as shown for instance in FIG. 33.

Next, control in lightening and extinguishing the light guide 9 will be explained. Although in the above-mentioned embodiment there has been explained control in lightening and extinguishing the light guide 9 during light quantity control of the T mode and N mode, control in lightening and extinguishing the light guide 9 may be also done as follows.

Figure 27:
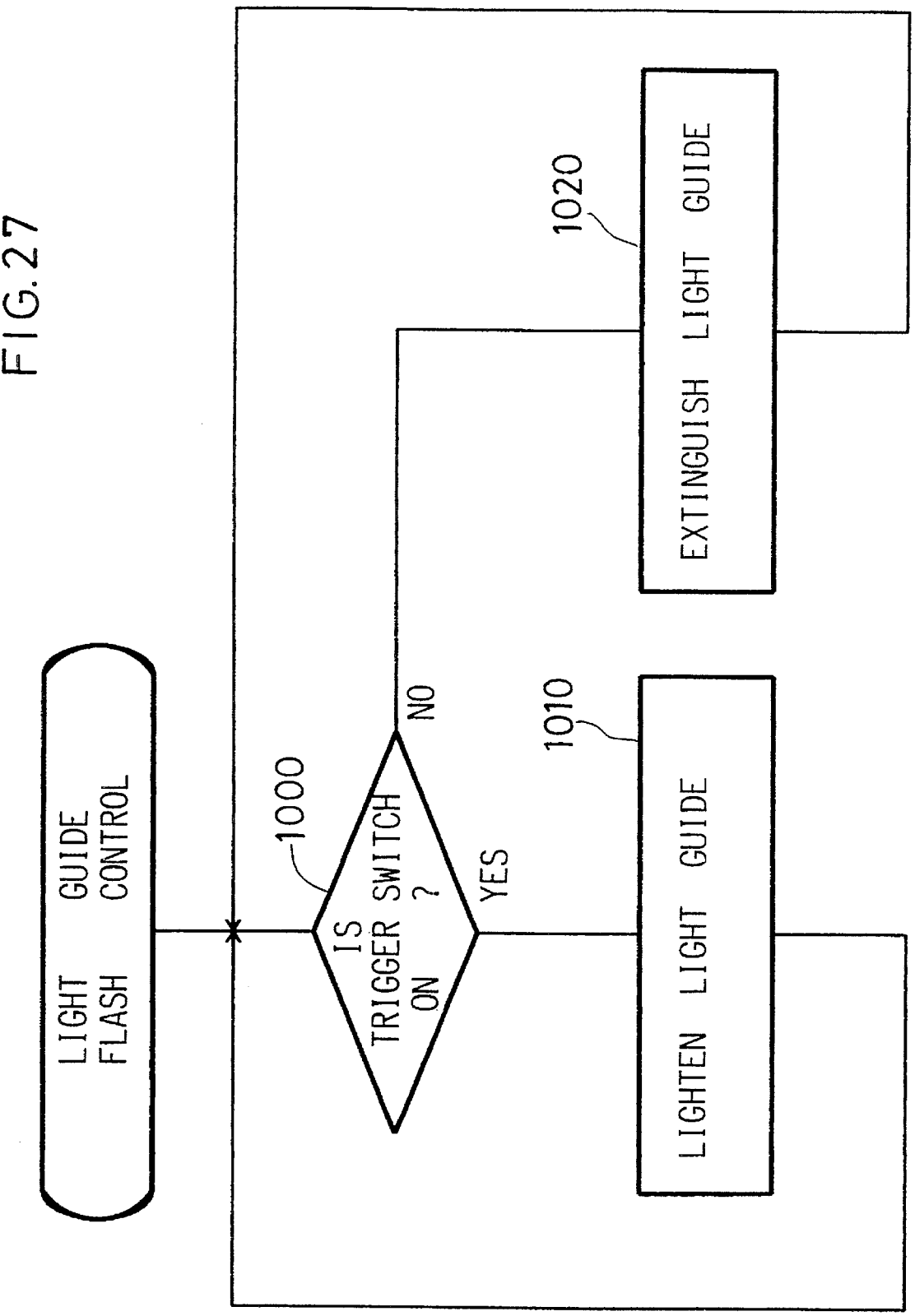
FIG. 27 is a flow chart indicative of a first example of flash control of the light guide.

As shown in FIG. 27 as a first example, whether the trigger switch 18 is turned on or not is determined at a step 1000. If the trigger switch 18 is turned on, the light guide 9 is lightened at a step 1010. If the trigger switch 18 is turned off, the light guide 9 is extinguished at a step 1020. As described above, the light guide 9 may be lightened and extinguished synchronously with the turning on and off timing of the trigger switch 18.

Figure 28:
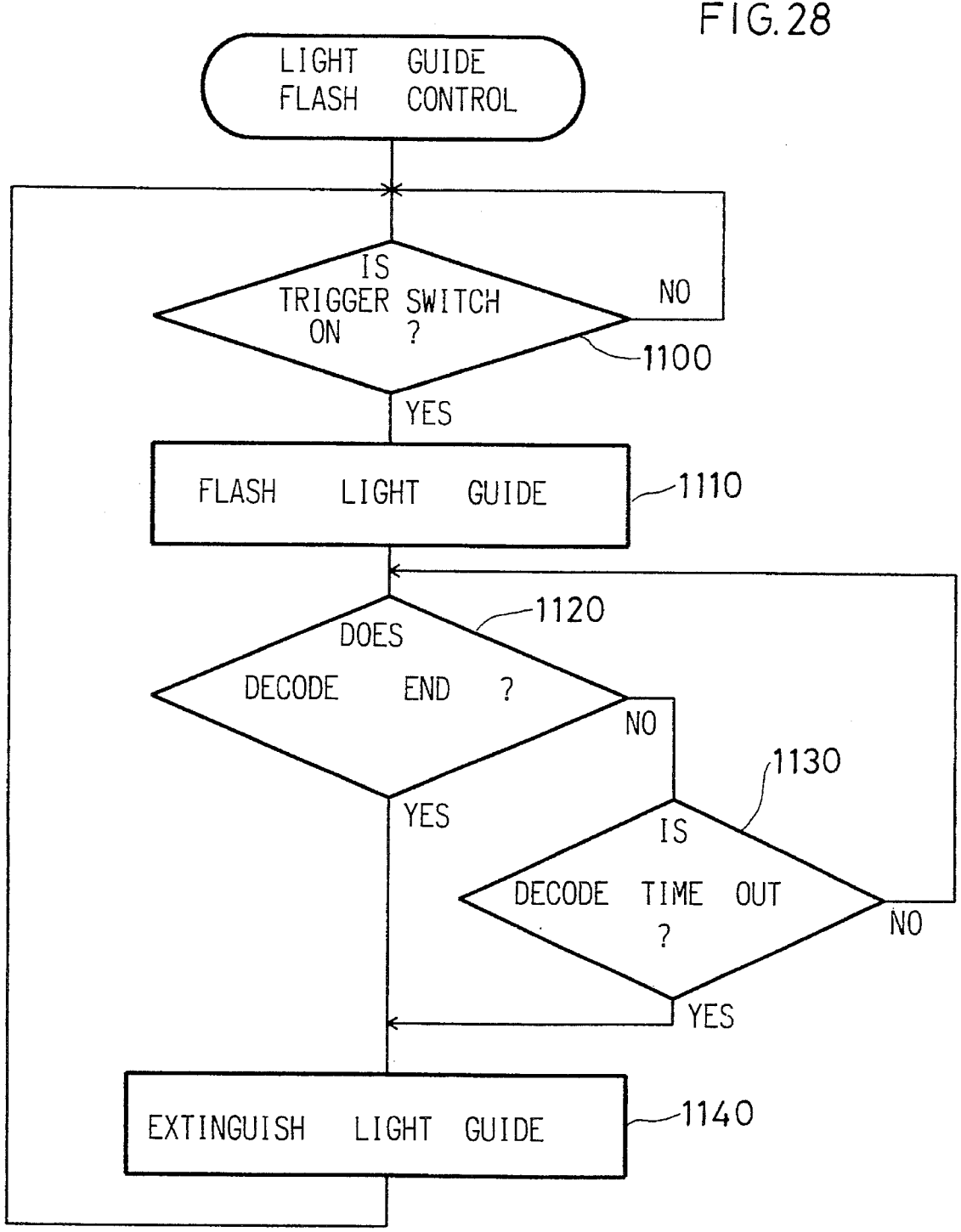
FIG. 28 is a flow chart indicative of a second example of flash control of the light guide.

As shown in FIG. 28, as a second example, whether the trigger switch 18 is turned on or not is repetitively determined at a step 1100 till the trigger switch 18 is turned on. When the trigger switch 18 is turned on, the light guide 9 is driven flashingly at a step 1110. Then, whether decode in the decode part 30 of ECU is ended or not is determined at a step 1120. If the decode has ended, the light guide 9 is extinguished at a step 1140. Subsequently, the routine shown in FIG. 28 returns to the step 1100 and is conditioned in waiting till the trigger switch 18 is turned on.

In case the decode processing is continued, the routine proceeds to a step 1130 in which whether the decode processing time is more than a predetermined necessary time (time out) is determined. If the decoded result is within the predetermined necessary time, the routine proceeds to the step 1120 in which the above-mentioned decision is again done. If the decode processing time lapses more than the predetermined necessary time, this means that the decode processing is failure. Thus, the routine proceeds to a step 1140 to extinguish the light guide 9. Thereafter, the routine returns to the step 1200 and is conditioned in waiting till the trigger switch 18 is turned on. As described above, the light guide 9 may be lightened and extinguished synchronously with the decode timing of the bar code 1.

Figure 29:
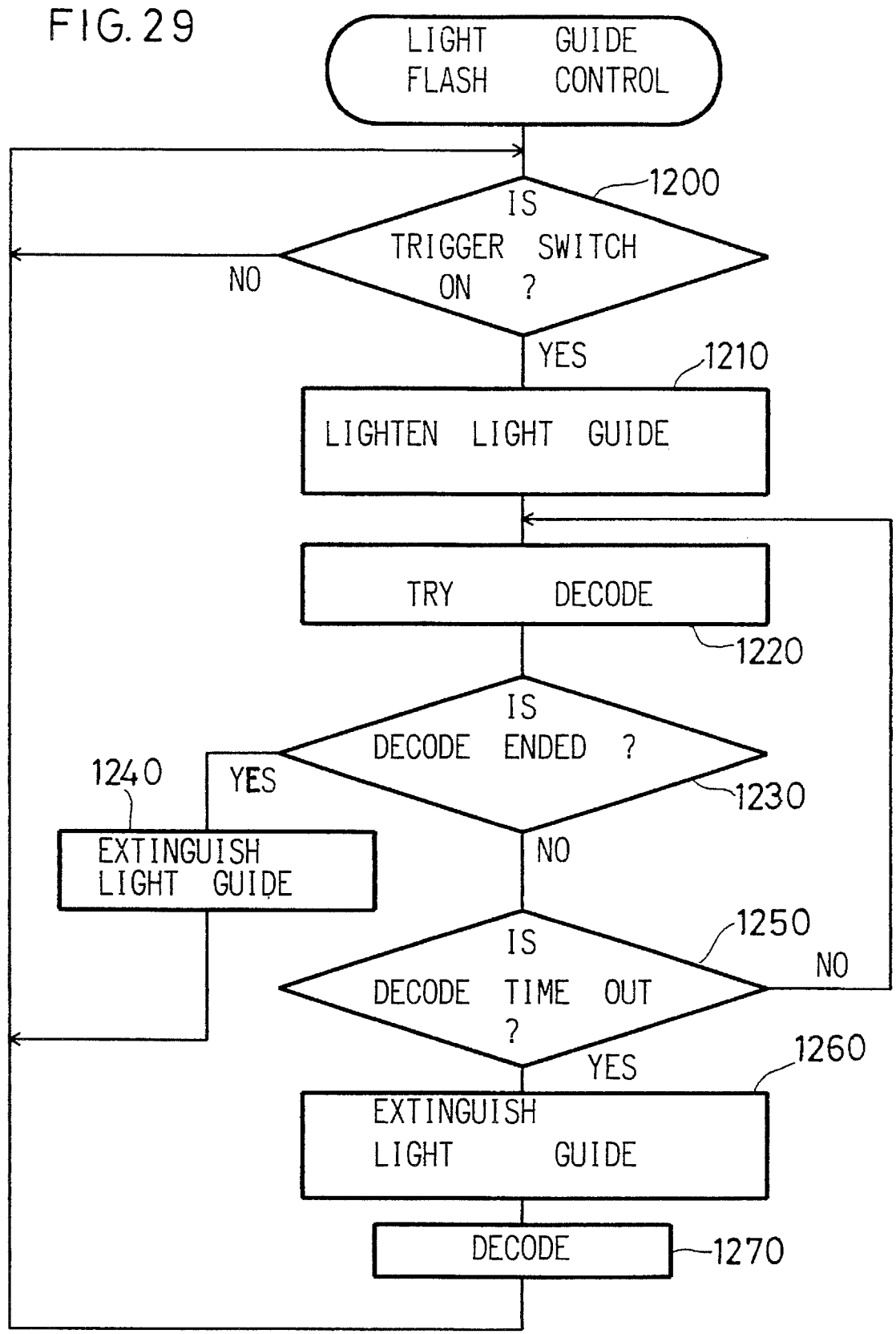
FIG. 29 is a flow chart indicative of a modification of the second example of flash control of the light guide.

As shown in FIG. 29 as a modification of the second example, whether the trigger switch 18 is turned on or not is repetitively determined at a step 1200 till the trigger switch 18 is turned on. When the trigger switch 18 is turned on, the light guide 9 is turned on at a step 1210. Subsequently, decode processing is started at a step 1220 and whether decode in the decode part 30 of ECU is ended or not is determined at a step 1230. If the decode has ended, the light guide 9 is extinguished at a step 1240. Then, the routine shown in FIG. 29 returns to the step 1200 and is conditioned in waiting till the trigger switch 18 is turned on.

In case the decode processing is continued, the routine proceeds to a step 1250 at which whether the decode processing time is more than a predetermined necessary time (time out) or not is determined. If the result of the decision is within the predetermined necessary time, the routine proceeds to the step 1220 at which the above-mentioned decision is done again. If the decode processing time has lapsed more than the predetermined necessary time, this means decode failure. Thus, the routine proceeds to a step 1260 at which the light guide 9 is extinguished. Then, decode processing is again performed at a step 1270.

In this modification, the light guide 9 is lightened and extinguished synchronously with decode timing of the bar code 1. Taking into account that reflected light when the light guide 9 has been lightened interferes with the decode processing as noises, the decode processing is again performed after extinguishment of the light guide 9, in case the decode processing has been failed at lightening of the light guide 9.

Figure 30:
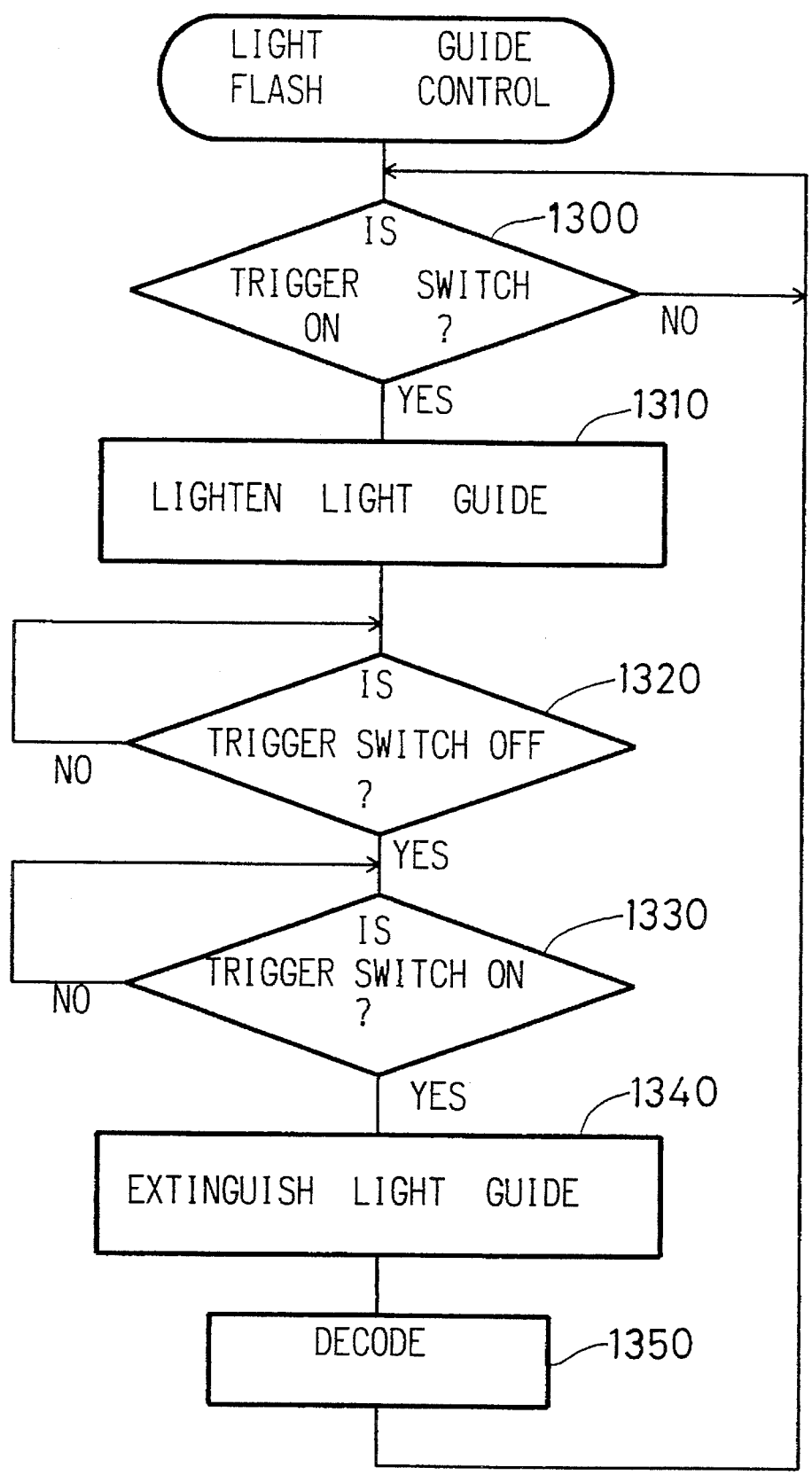
FIG. 30 is a flow chart indicative of a third example of flash control of the light guide.

As shown in FIG. 30, as a third example, whether the trigger switch 18 is turned on or not is repetitively determined at a step 1300 till the trigger switch 18 is turned on. When the trigger switch 18 is turned on, the light guide 9 is turned on at a step 1310.

Subsequently, whether the trigger switch 18 is turned off or not is repetitively determined at a step 1320 till the trigger switch 18 is turned off, and whether the trigger switch 18 is turned on or not is repetitively determined at a step 1330 till the trigger switch 18 is turned on. When the routine proceeds to a step 1340 based on result of the above-mentioned decision, the light guide 9 is extinguished at a step 1340 and thereafter decode processing is done at a step 1350.

As described above, the light guide 9 is lightened when the trigger switch 18 is turned on one time and the light guide 9 is extinguished when the trigger switch 18 is turned on one more time. In other words, the light guide 9 may be lightened and extinguished synchronously with the turn on timing of the trigger switch 18.

Figure 31A:
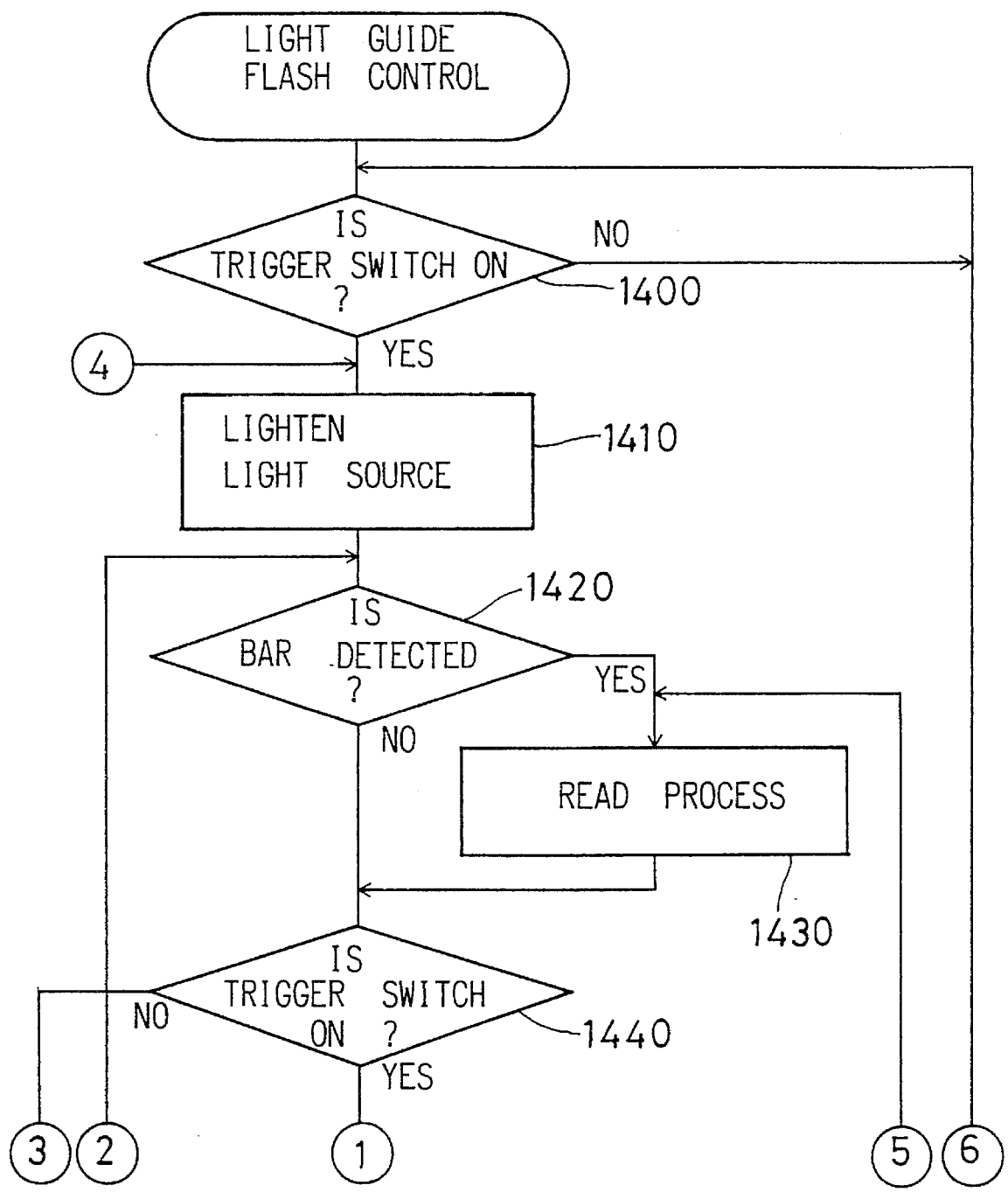
FIG. 31(a)–31(b) is a flow chart indicative of a fourth example of flash control of the light guide.
Figure 31B:
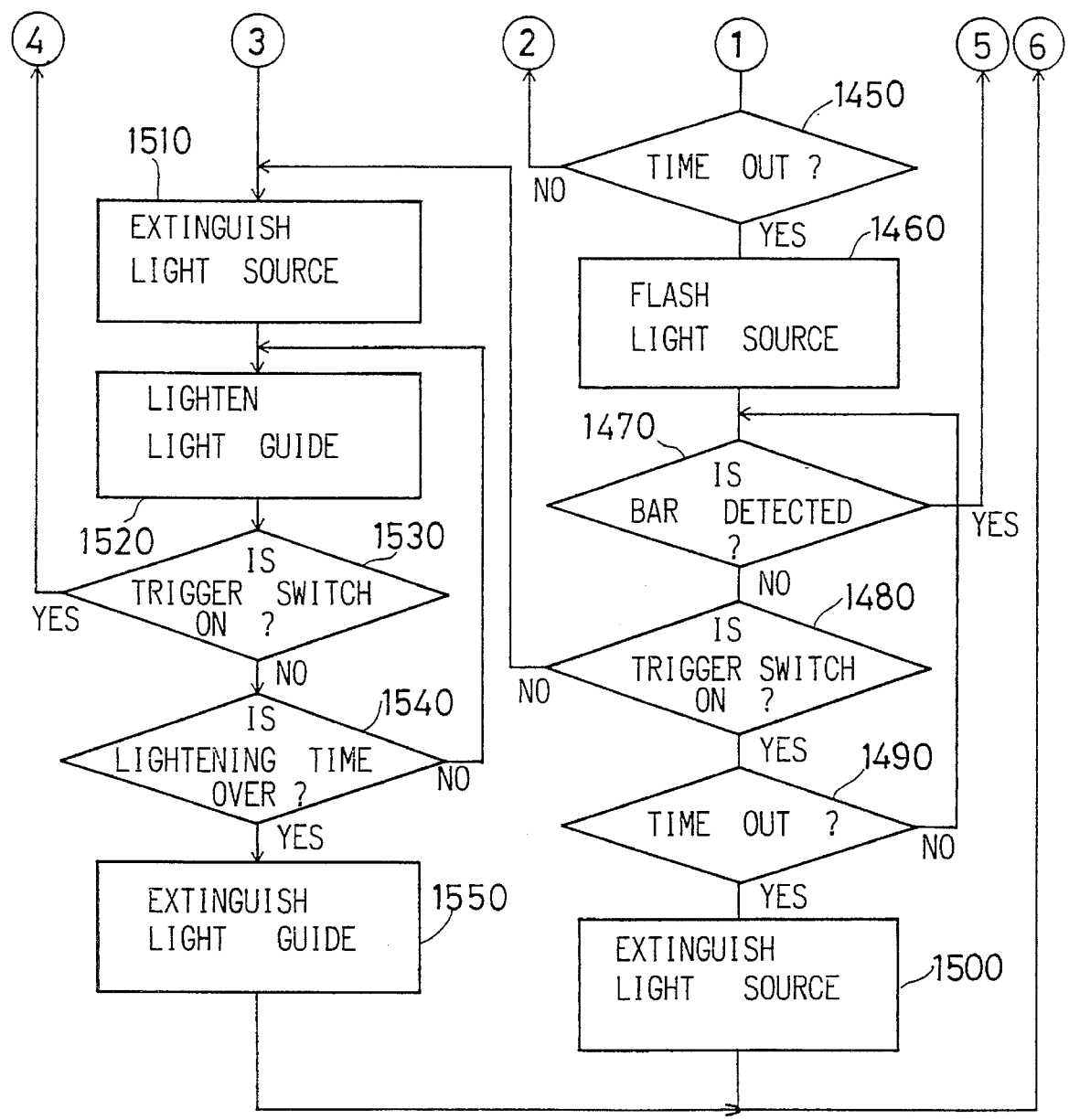

As shown in FIG. 31(a)–31(b), as a fourth example, whether the trigger switch 18 is turned on or not is repetitively determined at a step 1400 till the trigger switch 18 is turned on. When the trigger switch 18 is turned on, the light guide 3 is lightened at a step 1410. Subsequently, whether or not the bar is detected is determined at a step 1420. In case the fact that the bar is detected has been determined, the routine proceeds to a step 1430 to perform reading operation.

In case the bar is not detected has been determined at the step 1420, the routine proceeds to a step 1440 at which turning on and off states of the trigger switch 18 are determined. If the result of the decision represents that the trigger switch 18 was turned on before like the decision at the step 1400, namely that reading operation is continuously maintained, the routine proceeds to a step 1450 at which whether the decode processing time is more than a predetermined necessary time (time out) or not is determined. If the decision result is within the predetermined necessary time, the routine returns to the step 1420 at which the above-mentioned decision is again performed. If the decode processing time lapses more than the predetermined necessary time, this means decode failure. Thus, the routine proceeds to a step 1460 at which the light guide 3 is flashed.

At the following step 1470 whether the bar is detected or not is again determined. In case the bar is detected has been determined, the routine returns to the step 1430 at which the reading operation is performed. In case the bar is not detected has been determined at the step 1470, however, the routine proceeds to a step 1480 at which turning on and off states of the trigger switch 18 are decided. If the decision result indicates that the trigger switch 18 was continuously turned on, namely that the reading operation is continuously maintained, the routine proceeds to a step 1490 at which whether or not the decode processing time is more than a predetermined necessary time (time out).

If the decision result represents that the decode processing time is within the predetermined necessary time, the routine returns to the step 1470 at which the above-mentioned decision is again performed. If the decode processing time lapses more than the predetermined necessary time, this means decode failure. Thus, the routine proceeds to a step 1500 at which the light guide 3 is extinguished. Thereafter, the routine returns to the step 1400 and is conditioned in waiting till the trigger switch 18 is turned on.

In case of confirming whether the bar code 1 is maintained in the readable range or not under the turning off condition of the trigger switch 18 or temporal stop of reading operation on a basis of the decision result of turning on and off of the trigger switch 18 at the steps 1440 and 1480, the routine proceeds to a step 1510 to extinguish the light source 3. Then, the light guide 9 is lightened at a step 520 and the turning on and off of the trigger switch 18 is determined at the following step 1530.

In case the trigger switch 18 is turned on, namely reading operation is again performed after it is confirmed by the light guide 9 that the bar code 1 is in the readable range, the routine returns to the step 1410 at which the above-mentioned process is again performed.

In case the decision result of the step 1530 indicates that the trigger switch 18 was in its turning off condition before, whether lightening time of the light guide 9 is more than a predetermined time or not is determined. If the lightening time of the light guide 9 is within the predetermined time, the routine proceeds to the step 1520 at which the above-mentioned process is again performed. If the lightening time of the light guide 9 lapses more than the predetermined time, the routine proceeds to a step 1550 at which the light guide 9 is extinguished.

As described above, in case the decode processing of the bar code 1 has ended in failure, a lightening method of the light source 3 is changed to perform the decode processing again. In addition to this, the light guide 9 is lightened by turning off of the trigger switch 18 so as to resolve fear of the operator that as a result of decode failure the bar code 1 may not be in the readable range. Accordingly, it is possible to perform decode processing again after aim has been taken properly in the readable range.

Figure 32:
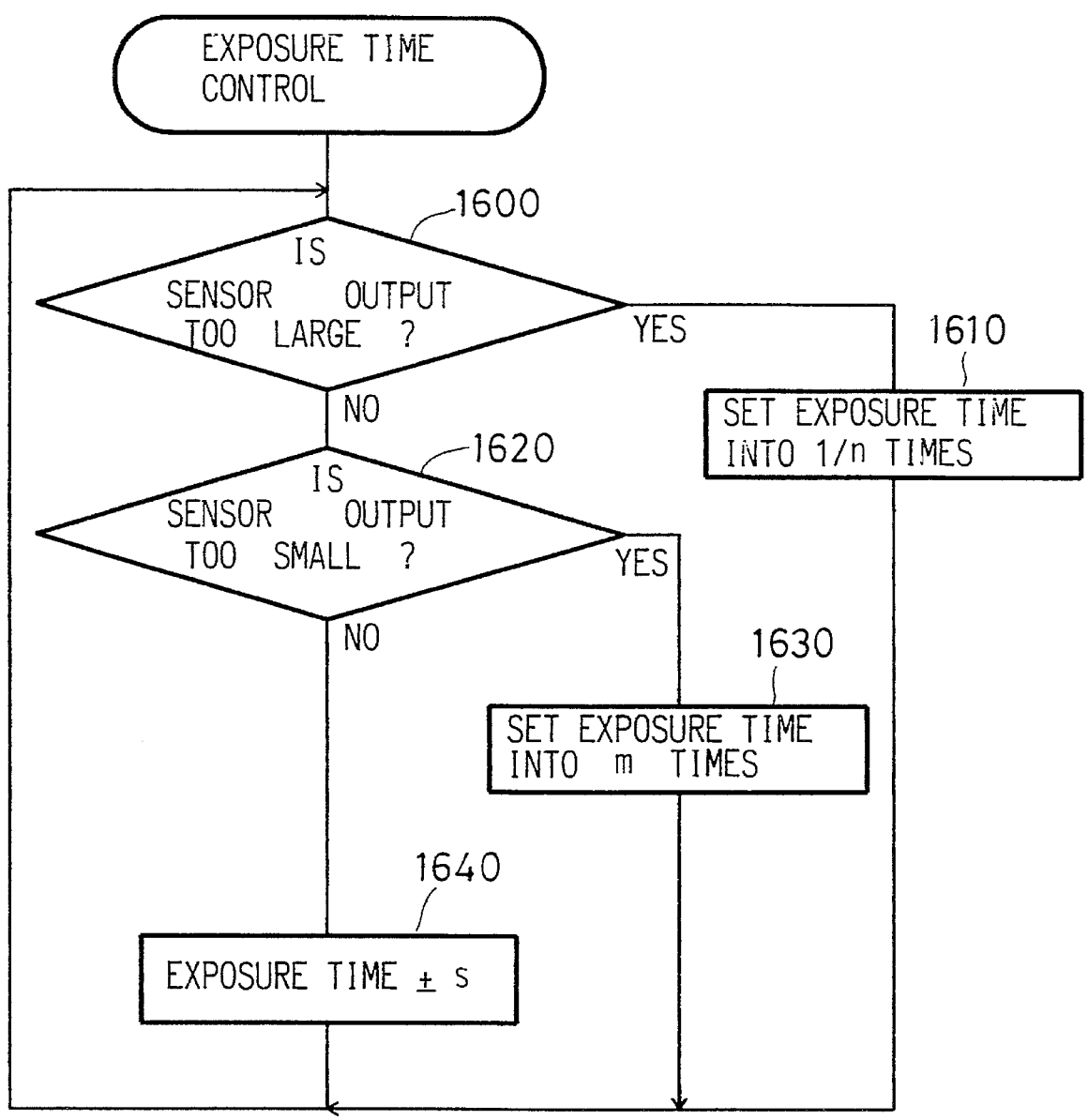
FIG. 32 is a flow chart indicative of exposure time control of the line sensor.

Next, exposure time control of the line sensor 7 will be explained. As shown in FIG. 32, whether output of the line sensor 7 is too large or not is determined at a step 1600. If the output is too large has been decided, the routine proceeds to a step 1610 at which the exposure time is shortened by 1/n times, the routine returning to the step 1600. If the output of the line sensor 7 is not too large, however, the routine proceeds to a step 1620 at which whether the output of the line sensor 7 is too small or not is determined.

If the output of the line sensor 7 is too small has been determined, the routine proceeds to a step 1600 at which the exposure time is extended by m times, the routine returning to the step 1600. If the output of the line sensor 7 is not too small has been determined at the step 1620, however, the routine proceeds to a step 1640 at which the exposure time is finely adjusted with ±s.

We claim:

1. An optical code information reader shaped as a hand-held type to be used in contact with and away from optical code information on a read object, said reader comprising:

a casing shaped to be held by hand, said casing having an opening;

light source means disposed in said casing for irradiating light to the read object having optical code information thereon;

an optical system for converging reflected light which is reflected by said reading object to enter through the opening and for focusing information image indicative of the optical code information on a predetermined reading position, said optical system including an iris;

image sensor means, having a scanning period and a shutter function and being arranged at the predetermined reading position, for converting the optical code information image into an electrical signal in accordance with the shutter function;

light intensity detection means for detecting, from a value of said electrical signal of said image sensor means, an intensity of the reflected light;

control means for controlling a shutter speed of said shutter function of said image sensor means in response to an output signal of said light intensity detection means so that said image sensor means operates with an optimum exposure condition; and guide light means in said casing for irradiating a guide light to said read object so that a readable image is indicated thereby without interfering with light passing through said iris.

2. An optical information reader as claimed in claim 1, wherein said light guide means is located in front of and away from said image sensor means.

3. An optical information reader as claimed in claim 2, wherein said light guide means and said light source means use a common light source located near said read opening.

4. An optical information reader as claimed in claim 1 further comprising:

reading state decision means for deciding whether a reading state is in a contact-reading state in which said read opening contacts said reading object or in a noncontact-reading state in which said reading opening separates from said reading object; and said control means controlling the exposure time on a basis of the detected result of said light intensity detection means and the decision result of said reading state decision means.

5. An optical information reader as claimed in claim 4, wherein said reading state decision means includes:

wavelength detection means for detecting a wavelength of reflected light reflected by said reading object when said light source means has irradiated light; and wavelength decision means for deciding based on a wavelength of the detected reflected light as to whether the reflected light is reflected light caused by light which said light source means has irradiated or reflected light including external light other than from said light source means.

6. An optical information reader as claimed in claim 4, wherein said reading state decision means reads, from said light intensity detection means, reflected light intensity when said light source means has irradiated light and reflected light intensity when said light source means does not irradiate light, and decides a reading state of the optical information on a basis of a ratio of both the reflected light intensity.

7. An optical information reader as claimed in claim 4, wherein said reading state decision means includes:

reflected light width detection means for detecting a width of reflected light caused by irradiation of the guide light on a basis of an electric signal outputted by said image sensor means when said light guide means has irradiated the guide light, so that said reading state decision means decides a reading state of the optical information on a basis of the detected width of the reflected light.

8. An optical information reader as claimed in claim 1, wherein said light source means includes:

a large number of light emission diodes which are arranged at more than two rows in a width direction of said read opening such that irradiating directions of light of the respective rows are set in directions different from each other.

9. An optical information reader as claimed in claim 1 further comprising:

an outer wall slanted along an angular range in which said optical system for imaging converges the reflected light.

10. The reader of claim 1, wherein said guide light means includes a pair of light emitting diodes provided at opposite sides of said iris.

11. The reader of claim 10, wherein guide light from said pair of diodes crosses inside said casing to form a pair of light spots indicating a readable range on opposite sides of said object to be read, said pair of light spots crossing inside said casing and emerging from said opening.

12. An optical information reader as claimed in claim 1 wherein said control means controls the light emission quantity together with the exposure time of said image sensor means.

13. An optical information reader apparatus comprising:

casing means shaped to be held by a hand and provided with an opening;

light source means provided in said casing means for projecting light to an object recorded with optical information to be read;

optical focusing means provided in said casing means for collecting reflection light from said object and focusing the same so that an optical image of said optical information is provided at a predetermined reading position;

image reading means, having a shutter function to control a light exposure time of light focused by said optical focusing means and provided at said predetermined reading position in said casing, for converting said optical image into an electric signal in accordance with the shutter function;

wavelength detecting means provided in said casing for detecting wavelength of said reflection light;

first deciding means for deciding, in response to detected wavelength, whether said reflection light is caused by the light from said light source means or includes ambient light outside said casing means;

second deciding means for deciding, in response to said detected wavelength, whether said opening is in contact with said object or spaced apart from said object; and control means for controlling in response to decision results of said first and second deciding means, the shutter function of said image reading means.

14. Optical information reader apparatus according to claim 13, wherein said control means controls said light exposure time to a minimum time at initial stage and thereafter to a longer time gradually.

15. Optical information reader apparatus according to claim 13, wherein said second deciding means operates only after said first deciding means has decided that said reflection light is caused by said light from said light source means.

16. The apparatus of claim 13, wherein:

said optical focusing means includes an iris for focusing said reflection light; and said apparatus further includes guide light means in said casing for irradating a guide light on said object so that a readable image is indicated thereby without interfering with light passing through said iris, said guide light means emitting blinking light using electric power from a power source.

17. Optical information reader apparatus according to claim 15, wherein said wavelength detecting means includes a plurality of detection devices having respective sensitivity peaks different from each other.

18. Optical information reader apparatus according to claim 11, wherein a first one of said detection devices has a first sensitivity peak at a first wavelength corresponding to said light from said light source means and a second one of said detecting devices has a second sensitivity peak at a second wavelength corresponding to light from other than said light source means.

19. Optical information reader apparatus according to claim 11, wherein said second deciding means performs the deciding operation thereof in response to intensity of light of said first wavelength.

20. Optical information reader apparatus according to claim 13, wherein said control means controls said light exposure time in accordance with an amount of light received by said image reading means, when said first deciding means has decided that said second wavelength is included in said reflection light.

21. Optical information reader apparatus according to claim 20, wherein said light source means changes intensity of said light when said light exposure time exceeds a predetermined time.

22. An optical information reader apparatus comprising:

casing means shaped to be held by a hand a provided with an opening;

light source means provided in said casing means for projecting light to an object recorded with optical information to be read;

optical focusing means provided in said casing means for collecting reflection light from said object and focusing the same so that an optical/image of said optical information is provided at a predetermine reading position;

image reading means, having a shutter function and being provided at said predetermined reading position in said casing, for converting said optical image into an electric signal in accordance with the shutter function;

guide light means provided adjacent to said optical focusing means in said casing for irradiating a guide light to said object so that a readable range is indicated thereby; and control means for controlling said guide light means in response to at least one of a mean value of the electric signal indicative of an intensity of said reflected light and reading operation of said image reading means.

23. An optical information reader apparatus comprising:

casing means to be held by a hand and provided with an opening;

light source means provided in said casing means for projecting light onto an object recorded with optical information to be read;

optical focusing means provided in said casing means for collecting reflection light from said object and focusing the same so that an optical image of said optical information is provided at a predetermined reading position;

image reading means provided at said predetermined reading position in said casing for converting said optical image into an electric signal;

wavelength detecting means provided in said casing and including a plurality of detection devices having respective sensitivity peak different from each other, for detecting wavelength of said reflection light;

first deciding means for deciding, in response to detected wavelength, whether said reflection light is caused by the light from said light source means or include ambient light outside said casing means;

second deciding means for deciding, in response to said detected wavelength, whether said opening is in contact with said object or spaced apart from said object; and control means for controlling response to decision results of said first and second deciding means, light exposure time of said image reading means.

24. Optical information reader apparatus according to claim 23, wherein first one of said detection devices has a first sensitivity peak at a first wavelength corresponding to said light from said light source means and second one of said detecting devices has a second sensitivity peak at a second wavelength corresponding to light other than said light source means.

25. Optical information reader apparatus according to claim 23, wherein said second deciding means performs deciding operation thereof in response to intensity of light of said first wavelength.

26. An optical information reader shaped in a hand-held type to be used in contact with and away from an optical information on a read object, said reader comprising:

light source means for irradiating light to said read object on which said optical information is recorded;

an optical system for converging reflected light within a predetermined angular range which is reflected by said read object to enter through a read opening and for focusing an information image indicative of said optical information on a predetermined reading position;

image sensor means, having a shutter function and being arranged at the reading position, for converting the information image into an electrical signal;

light intensity detection means for detecting, from a mean value of said electrical signal of said image sensor means, an average intensity of the reflected light each time said image sensor means performs reading operation thereof; and control means for controlling a shutter speed of said shutter function of said image sensor means in response to an output signal of said detection means so that said image sensor means operates with an optimum exposure condition, wherein said control means includes:

determining means for determining whether the output signal of said detection means is above a predetermined value;

speed changing means for changing a shutter speed of said image sensor means by a predetermined amount; and repeating means for repeating a speed changing operation of said speed changing means until said output signal reaches said predetermined value.

27. A reader according to claim 26, wherein said detection means includes an integrator for integrating said electrical signal of said image sensor means to obtain the mean value.

28. An optical information reader apparatus according to claim 22, wherein said control means is further for, when said optical information reader apparatus is in a contact reading state, controlling said guide light means to cause said guide light means to extinguish said guide light, and when said optical information reader apparatus is in a noncontact reading state, controlling said guide light means to cause said guide light means to generate said guide light.

* * * * *